US011729077B2

(12) United States Patent
Qian et al.

(10) Patent No.: US 11,729,077 B2
(45) Date of Patent: Aug. 15, 2023

(54) CONFIGURATION AND MANAGEMENT OF SCALABLE GLOBAL PRIVATE NETWORKS

(71) Applicant: Amazon Technologies, Inc., Seattle, WA (US)

(72) Inventors: Baihu Qian, Chicago, IL (US); Bashuman Deb, Herndon, VA (US); Omer Hashmi, Bethesda, MD (US); Thomas Nguyen Spendley, Rockville, MD (US); Nikhil Reddy Cheruku, Alexandria, VA (US); Alok Mishra, Bellevue, WA (US); Alexander Justin Penney, Falls Church, VA (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 16/699,431

(22) Filed: Nov. 29, 2019

(65) Prior Publication Data
US 2021/0168056 A1   Jun. 3, 2021

(51) Int. Cl.
*H04L 41/0813* (2022.01)
*H04L 41/22* (2022.01)
(Continued)

(52) U.S. Cl.
CPC ...... *H04L 43/0817* (2013.01); *H04L 41/0813* (2013.01); *H04L 41/22* (2013.01); *H04L 43/0823* (2013.01); *H04L 63/0272* (2013.01)

(58) Field of Classification Search
CPC . H04L 43/0813; H04L 41/0817; H04L 41/22; H04L 43/0823; H04L 63/0272
See application file for complete search history.

(56) References Cited

U.S. PATENT DOCUMENTS

| 7,978,691 B1 | 7/2011 | Cole |
| 8,307,065 B2 | 11/2012 | McNaughton et al. |

(Continued)

FOREIGN PATENT DOCUMENTS

| WO | WO2016209317 A1 | 3/2017 | |
| WO | WO2019199495 | 10/2019 | |
| WO | WO-2019199495 A1 * | 10/2019 | ......... G06F 16/9035 |

OTHER PUBLICATIONS

PCT International Search Report and the Written Opinion for Application No. PCT/US2020/062347 dated Mar. 10, 2021, 16 pgs.

(Continued)

*Primary Examiner* — Uzma Alam
(74) *Attorney, Agent, or Firm* — Lee & Hayes, P.C.

(57) ABSTRACT

This disclosure describes techniques for configuring and managing scalable global private networks associated with a service provider. Different input mechanisms, such as an API, a UI, or a CLI may be utilized to configure, and manage a global private network that spans across the cloud in different geographic locations and connects to different stand-alone networks. The user may proactively use the input mechanisms to configure and query different network resources to reactively configure settings for reacting to one or more events. The input mechanisms may also be utilized to define the network resources to be modeled within the global private network as well as connections within the global network. A user may configure events/metrics to be monitored, tasks/workflows to be performed, and the like. In some configurations, a network management service (NMS) may perform health monitoring and reachability monitoring to identify possible issues in the global network.

20 Claims, 16 Drawing Sheets

(51) Int. Cl.
   *H04L 9/40* (2022.01)
   *H04L 43/0817* (2022.01)
   *H04L 43/0823* (2022.01)

(56) References Cited

U.S. PATENT DOCUMENTS

| | | | |
|---|---|---|---|
| 8,886,831 B2 | 11/2014 | Tirumalai et al. | |
| 9,277,500 B1 | 3/2016 | Solsona-Palomar et al. | |
| 9,614,781 B1 | 4/2017 | Goltzman et al. | |
| 10,063,427 B1* | 8/2018 | Brown | H04L 41/0856 |
| 10,102,019 B2 | 10/2018 | Brophy | |
| 10,127,618 B2 | 11/2018 | Chrapko et al. | |
| 10,169,135 B1 | 1/2019 | Pandey et al. | |
| 10,270,712 B1 | 4/2019 | Lippitt et al. | |
| 10,469,304 B1* | 11/2019 | Kempe | H04L 41/085 |
| 10,721,124 B2 | 7/2020 | Patil et al. | |
| 11,003,466 B2* | 5/2021 | Sinha | G06F 9/451 |
| 11,159,569 B2* | 10/2021 | Janakiraman | H04L 12/4641 |
| 2003/0193899 A1 | 10/2003 | Wang | |
| 2008/0298374 A1 | 12/2008 | Rhoades et al. | |
| 2010/0020700 A1* | 1/2010 | Kailash | H04L 63/1425 370/242 |
| 2010/0153001 A1 | 6/2010 | Bauchot et al. | |
| 2011/0179371 A1* | 7/2011 | Kopycinski | G06Q 10/10 715/772 |
| 2011/0243553 A1 | 10/2011 | Russell | |
| 2012/0051243 A1 | 3/2012 | Faye et al. | |
| 2013/0077533 A1 | 3/2013 | Deprun et al. | |
| 2014/0086043 A1 | 3/2014 | Banerjee et al. | |
| 2015/0119035 A1 | 4/2015 | Ganu et al. | |
| 2015/0339136 A1 | 11/2015 | Suryanarayanan et al. | |
| 2015/0347935 A1* | 12/2015 | Standing | G05B 19/042 705/7.27 |
| 2016/0112350 A1 | 4/2016 | Morrison et al. | |
| 2016/0127454 A1* | 5/2016 | Maheshwari | H04L 67/10 709/223 |
| 2017/0085446 A1 | 3/2017 | Zhong et al. | |
| 2017/0324628 A1 | 11/2017 | Dhanabalan | |
| 2017/0336771 A1 | 11/2017 | Salter | |
| 2018/0018082 A1* | 1/2018 | Sarbin | H04L 41/0893 |
| 2018/0124090 A1* | 5/2018 | Koren | H04L 63/1416 |
| 2018/0322558 A1 | 11/2018 | Padmanabh et al. | |
| 2019/0173780 A1* | 6/2019 | Hira | H04L 45/22 |
| 2019/0235742 A1* | 8/2019 | Tilikin | G06T 11/60 |
| 2019/0268218 A1* | 8/2019 | Thomasson | H04L 41/0879 |
| 2019/0364615 A1 | 11/2019 | Das et al. | |
| 2020/0028758 A1* | 1/2020 | Toilet | H04L 45/586 |
| 2020/0137067 A1 | 4/2020 | Nambiar et al. | |
| 2020/0167319 A1* | 5/2020 | Fritz | H04L 41/0806 |
| 2020/0322249 A1* | 10/2020 | Liu | H04L 41/145 |
| 2021/0067553 A1* | 3/2021 | Ries | H04L 63/08 |
| 2021/0073034 A1* | 3/2021 | Bliesner | G06F 9/5022 |
| 2021/0111962 A1* | 4/2021 | Todd | G06F 9/451 |
| 2021/0168036 A1 | 6/2021 | Qian et al. | |
| 2021/0168056 A1 | 6/2021 | Qian et al. | |
| 2022/0132519 A1 | 4/2022 | Dalsgaard | |

OTHER PUBLICATIONS

Office Action for U.S. Appl. No. 16/699,446, dated Jun. 24, 2021, Qian, "Configuration and Management of Scalable Global Private Networks", 8 pages.
Office Action for U.S. Appl. No. 16/699,424, dated May 4, 2022, Qian, "Configuration and Management Df Scalable Global Private Networks", 18 pages.
International Preliminary Report on Patentability for PCT Application No. PCT/US20/62347, dated Jun. 9, 2022, 10 pages.
Office Action for U.S. Appl. No. 16/699,424, dated Nov. 2, 2021, Qian, "Configuration and Management of Scalable Global Private Networks", 16 pages.

\* cited by examiner

Global Private Networks

GATEWAYS 522

DEVICES 524

REGIONS 526

CONNECTIONS 528

CONFIGURATION 530

Select Gateway to Register 532

SEARCH BOX FOR GATEWAY

| IDENTIFIER | REGION STATE | |
|---|---|---|
| GATEWAY 2 – US-EAST | US-EAST | AVAILABLE |
| GATEWAY 3 – US-WEST | US-WEST | AVAILABLE |
| GATEWAY 12 – EUROPE | EUROPE | AVAILABLE |

534

CANCEL 536

REGISTER GATEWAY 538

CONFIGURATION AND MANAGEMENT OF SCALABLE GLOBAL PRIVATE NETWORKS

BACKGROUND

Companies of all sizes are challenged with efficiently and reliably networking their branch offices. To connect a remotely located branch office, a company may utilize a private network that includes leased line circuits that are backhauled to a corporate data center and/or the use of lower-cost broadband Internet. As a company that utilizes leased line circuits expands and add more branches, the company continues to add physical, leased line wide area networks (WANs). Scaling out these traditional WANs can be costly as companies have to provision and manage expensive new leased-lines and hardware. While some companies may attempt to utilize lower-cost broadband Internet to connect remote branches, the use of lower-cost broadband Internet to expand can also be difficult and time-consuming. For example, a company may spend a significant amount of time and money developing custom solutions to utilize broadband Internet. These custom solutions may include custom software and may use software, and devices from various networking vendors. The company may also have to obtain Internet services from a variety of different broadband providers.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5B is a diagram showing an exemplary graphical user interface for registering a gateway to include within a global network.

DETAILED DESCRIPTION

Figure 1:
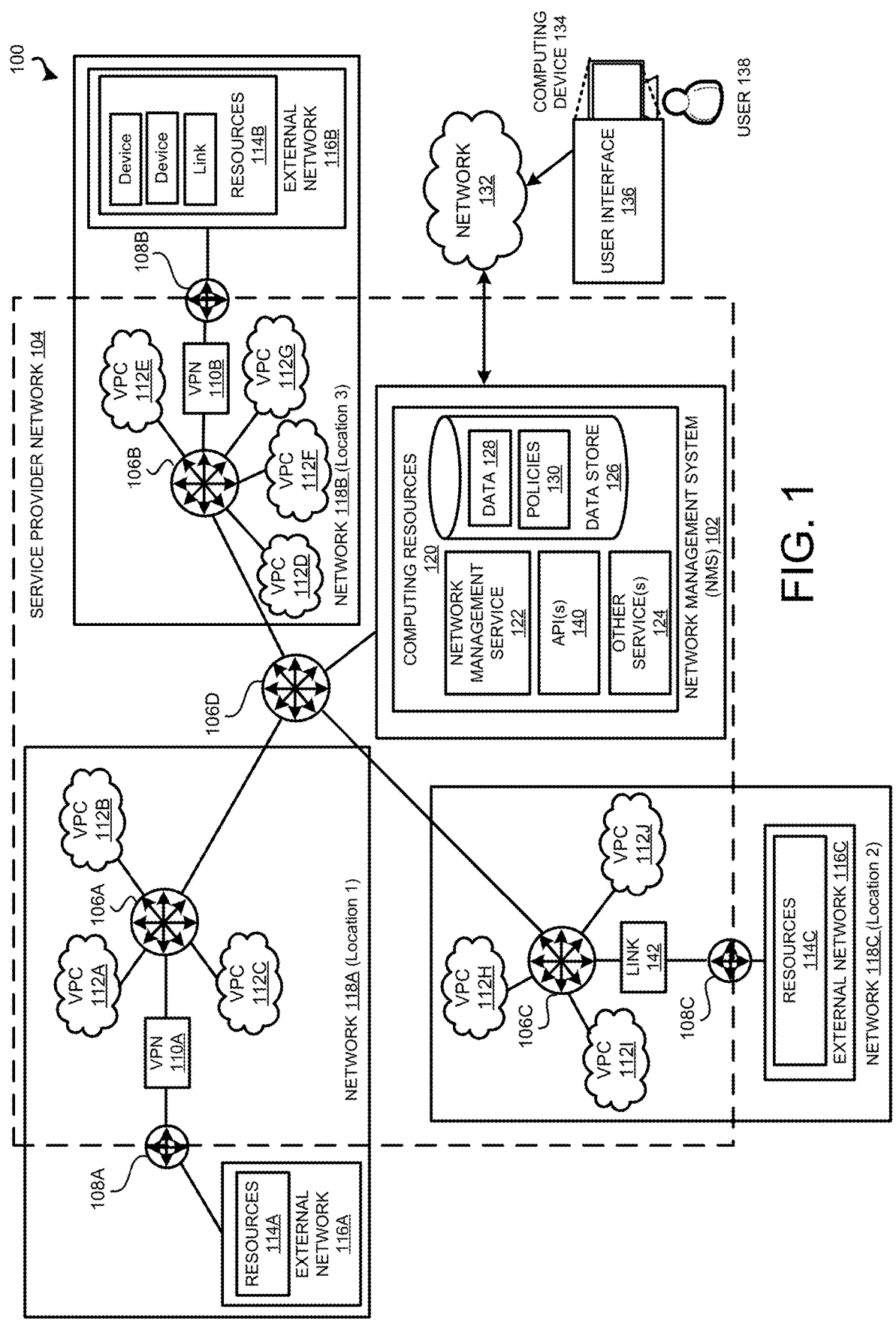
FIG. 1 is a software and network architecture diagram showing aspects of configuration and management of a scalable global private network.

This disclosure relates to techniques for configuring and managing scalable global private networks. As used herein, a "scalable global private network", which may be referred to herein is a "global private network" or "global network", is a network that utilizes one or more service/cloud provider networks (sometimes referred to simply as a "cloud") to span different geographic locations and connect different stand-alone networks. A "stand-alone network" may include networks that are external to the service provider network (e.g., at client-owned premises or client-managed data centers) and/or networks that include computing resources allocated within a service provider network on behalf of a user (e.g., a virtual private cloud (VPC)). Using techniques described herein, a user of a service provider network may utilize a network management service (NMS) to configure, visualize, and manage a global private network that spans across the cloud in different geographic locations and connects to different stand-alone networks associated with the user.

According to some configurations, the NMS may expose different input mechanisms to interact with a global private network, such as a graphical user interface (GUI), a user interface (UI), a command line interface (CLI), an application programming interface (API), and the like. In some examples, the NMS may generate a connected graph using industry-standard graph description language to represent the global private network and then display a visual representation of the network graph within a GUI. The network graph may include nodes that represent different aspects of the global network, such as computing resources, networking resources, and other indicators that show connections between different the resources, as well as data that may indicate information about the global private network (e.g., metrics, events, versions of the graph, changes to the graph, . . . ). According to some configurations, the user, or some device, service, or component may also query the network graph. For instance, a user may provide a query to the NMS to determine whether a particular change has been made to the network, locate one or more resources within the network, view one or more metrics, and the like. These graph-based queries may be performed by a user to analyze the network at scale such that the user does not have to generate a query for each different region and/or network that is part of the global network.

According to some configurations, the NMS may associate metadata with the network graph. As an example, the NMS may annotate the network graph to indicate network capacity, metadata, state, and the like. The annotations may be associated with nodes of the graph and/or edges of the graph that connect the nodes. The NMS may also generate subgraphs for portions of the global network, such that cloud, or stand-alone local networks can be imported/exported and merged into the global network. For instance, the user may request that a graph be generated of a stand-alone network that the user wants to add to the global network. After generating the network graph, the user may utilize the GUI to connect the stand-alone network to the global network.

According to some examples, the NMS exposes an API for the configuration and management of the global network. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The user may utilize the API and/or some other input mechanism to configure and manage the global private network from one location. The user may proactively use the API to configure and query different network resources as well as use the API to reactively configure settings for reacting to one or more events. The events may indicate changes to the global network, such as but not limited to network additions, deletions, topology changes, and the like. The user may also use the API to configure alarms that may be triggered in response to a metric associated with the network changing (e.g., exceeding a value, dropping below a specified value, entering/leaving a particular range of values, . . . ).

Having the ability to configure and manage a global private network from a centralized location helps the user to build self-healing networks. For instance, the user may configure monitoring of different events and alarms and based on an occurrence of an alarm and/or an event perform an event-driven configuration (e.g., using AWS® Lambda) that automatically reacts to network changes quickly and provides the user with tools to automatically reconfigure their global private networks to mitigate impacts without human intervention. The API may also be utilized by the user to define the network resources to be modeled within the global private network, the connections between the network resources, the connections between a stand-alone network, the cloud network, and/or other networks.

In some examples, the user might also utilize the GUI, API, or CLI exposed by the NMS to configure metrics to be monitored, tasks/workflows to be performed (e.g., based on an occurrence of one or more events and/or alarms being triggered), and the like. In some configurations, the NMS may also perform operations on behalf of the user, such as health monitoring, reachability analysis (static and/or dynamic) and monitoring, and the like. As users run tasks across the cloud and stand-alone networks forming the global private network, the NMS may perform dynamic network reachability monitoring to assist the user in identifying possible problems with connectivity between different endpoints. For example, the NMS may utilize Two-Way Active Measurement Protocol (TWAMP), or some other dynamic analysis to identify connectivity between endpoints.

The Two-Way Active Measurement Protocol (TWAMP) is an open protocol that may be used to measure network performance between two network endpoints (e.g., devices in the network) that support the TWAMP framework. Generally, TWAMP is a framework that separates sessions based on the client/server architecture. The TWAMP client initiates a Transmission Control Protocol (TCP) connection and acts as a control-client and a session-sender, while the TWAMP server acknowledges the TCP connection and performs the roles of a server and a session-reflector. TWAMP-Control messages are exchanged between the endpoints and TWAMP-Test messages are exchanged between the session-sender and the session-reflector.

Managing reachability can be difficult in large, complex networks that span across both stand-alone networks and the cloud, as the monitoring and analysis of the reachability depends on the correct configuration of many resources and networking devices. Further, the global network may include firewalls, security groups, access control lists (ACLs)/network access control lists (NACLs) that are configured to block/allow traffic to flow between different network endpoints. In some cases, static network reachability analysis can be performed by the NMS before tasks are run across the global network. For instance, in some examples, the NMS may use formal methods, or some other verification technique, to determine whether the network is configured properly such that network endpoints are reachable. "Formal methods" refers to design techniques that use rigorously specified mathematical models to build software and hardware systems. Formal methods may utilize mathematical proof as a complement to dynamic testing in order to help ensure correct behavior. According to some configurations, the NMS is configured to perform static reachability analysis and/or dynamic reachability monitoring to determine network reachability between endpoints and policy-based reachability to simplify the network monitoring and management.

According to some configurations, users may also define policies or intents on reachability, such as "VPC A can reach stand-alone network in CIDR range X" or "VPC D cannot reach VPC E", and the NMS configures the network accordingly. This makes network management and configuration easier and less error-prone. In some examples, users may specify metrics and/or alarms for different endpoints within the network (e.g., monitor whether two points in a network, A and B, can or cannot reach each other).

While the techniques described herein are with reference to configuring and managing global networks, the techniques are equally applicable to management of other networks. Additionally, while the examples herein discuss utilization of networks provided by a service provider, implementations are not so limited. For example, the techniques provided herein may be operating in other networks, across networks provide by different service providers, and the like.

Certain implementations and examples of the disclosure will now be described more fully below with reference to the accompanying figures, in which various aspects are shown. However, the various aspects may be implemented in many different forms and should not be construed as limited to the implementations set forth herein. The drawings herein are not drawn to scale. Like numerals represent like elements throughout the several figures (which might be referred to herein as a "FIG." or "FIGS.").

FIG. 1 is a software and network architecture diagram 100 showing aspects of configuration and management of a scalable global network. It is to be appreciated that the environment 100 is merely illustrative and that the various configurations disclosed herein can be utilized in many different types of computing environments.

To provide functionality disclosed herein, the NMS 102 may include one or more computing resources 120. The computing resources 120 may be provided by a service provider that operates one or more service/cloud provider networks 104 (sometimes referred to simply as a "cloud"), which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network, etc.) and the hardware and software in cloud provider data centers that provide those services.

A cloud provider network can be formed as a number of different regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster (or other event) should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network and may be collocated at other network provider facilities (e.g., Internet service providers, telecommunications providers) and securely connected (e.g. via a VPN or direct connection) to the availability zones. Each region can operate two or more TCs for redundancy. The cloud provider network may deliver content from points of presence outside of, but networked with, these regions by way of edge locations and regional edge cache servers.

The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients. The computing resources 120 implemented by the NMS 102 and executed on behalf of one or more users of the service provider can be data processing resources, such as virtual machine ("VM") instances, data storage resources, networking resources, data communication resources, network services, and other types of resources.

The computing resources 120 utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The NMS 102 can also include and utilize other types of computing resources not mentioned specifically herein.

According to some configurations, servers are utilized to provide at least a portion of the computing resources 120 and execute software components to provide functionality described herein, including functionality related to the configuration and management of global private networks. The software components can execute on a single server or in parallel across multiple servers in the NMS 102. In addition, a software component can consist of subcomponents executing on different servers or other computing devices in the NMS 102. Various components can be implemented as software, hardware, or any combination of the two. In this regard, it is to be appreciated that the NMS 102 shown in FIG. 1 has been simplified for discussion purposes and that many additional software and hardware components can be utilized.

A user 138 of the NMS 102 can utilize a computing device 134, or some other input device, to access the NMS 102 through a network 132. The user 138 may be a user of the service provider network 104 that provides computing resources within the service provider network 104. The computing device 134 is an input/output device configured to receive input associated with specifying parameters utilized by the network management service 122 to configure and manage global private networks. The computing device 134 may also present for display a user interface 136, that may be utilized by the user 138 to view a graphical representation of a global private network, interact with the graphical representation to set or view parameters associated with the global private network, and the like. The user interface 136 may also be utilized by the user as a CLI to interact with the global private network.

The computing device 134 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, or any other type of computing device capable of connecting to the network 132 and communicating with the NMS 102.

As illustrated, the computing device 134 may couple with the NMS 102 over a network 132. The network 132 may represent an array or wired networks, wireless networks (e.g., WiFi), or combinations thereof. The NMS 102 may provide a variety of different services (not shown) as a network-accessible platform that is implemented as a computing infrastructure of processors, storage, software, data access, and so forth that is maintained and accessible via the network 132, such as the Internet. These services may not require end-user knowledge of the physical location and configuration of the system that delivers the services. Common expressions associated with these remote services, include "on-demand computing", "software as a service (SaaS)", "platform computing", "network accessible platform", and so forth.

The network 132 can be a local-area network ("LAN"), a wide-area network ("WAN"), the Internet, or any other networking topology known in the art that connects the user devices to the NMS 102. The user 138 can use an application (not shown) executing on computing device 134 to access and utilize the functionality provided by NMS 102. In some examples, the application is a web browser application, such as the Amazon® Silk® web browser, or some other web browser. Generally, a web browser application exchanges data with the computing devices in the NMS 102 using the hypertext transfer protocol ("HTTP") over the network 132.

The application might also be a stand-alone client application configured for communicating with the NMS 102. The client application can also utilize any number of communication methods known in the art to communicate with the NMS 102 across the network 132, including remote procedure calls, SOAP-based web services, remote file access, proprietary client-server architectures, and the like. According to some configurations, the application provides a user interface 136 that can be utilized by the user 138 for the configuration and management of one or more global private networks. The user interface 136 may also be utilized to present data, and/or to interact with the NMS 102.

In some examples, web service users or, in general, clients may utilize or otherwise control a processing entity of the service provider to control, access, or otherwise manage other computing resources. As such, data associated with the processing entity and/or the computing resources of the service provider may be transmitted to or received from computing resources of a client's private network (or other local network) via one or more network connections. As used herein, a processing entity may be a computing resource of the service provider and may include one or more computing devices, such as instantiated virtual machine instances, configured to access data of the distributed computing system (e.g., provided by the distributed system and acting on behalf of a client or user of the system).

In some configurations, the service provider may also provide storage, access, and/or placement of one or more computing resources through a service such as, but not limited to, a web service, a cloud computing service, or other network-based data management service. For example, a user or processing entity acting on behalf of the user may access, via the service provider, data storage services and/or data management services such that access mechanisms may be implemented and/or provided by the service provider to the processing entity utilizing the computing resources. In some examples, computing resource services, such as those provided by the service provider, may include one or more computing resources accessible across one or more networks through user interfaces (UIs), application programming interfaces (APIs), and/or other interfaces where the one or more computing resources may be scalable and/or expandable as desired As briefly discussed above, a user of a service provider network, and/or a component or device, may utilize the NMS 102 to configure, visualize, and manage a global private network that spans across the cloud in different geographic locations and connects to different stand-alone networks associated with the user. According to some configurations, the NMS 102 exposes different input mechanisms to interact with a global private network, such as a user interface (UI) 136, a command line interface (CLI), API(s) 140, and the like. In some examples, the NMS 102 may generate a connected graph using industry-standard graph description language to represent the global private network. The NMS 102, network management service 122, or some other component may display a visual representation of the network graph within a GUI, such as within UI 136 (e.g., See FIGS. 5C, 5D, and 5E). The NMS 102 may store the graph as data 128 in the data store 126, or at some other location (e.g., in a data store of an external network 116).

The network graph may include nodes that represent different resources and/or connections between resources/networks, indicators that show connections between the nodes, as well as data that may indicate information about the global private network (e.g., metrics, events, versions of the global network, changes to the global network, . . . ). According to some configurations, the user 138 and/or service, device, or component may also query the network graph. For instance, a user or service (e.g., network management service 122 and/or other service(s) 124) may provide a query via a CLI, an API, using a search box within a GUI, to the NMS 102 to determine whether a particular change has been made to the network, locate one or more resources within the network, view one or more metrics, and the like. These graph-based queries may be performed by a user 138 to analyze the network at scale such that the user does not have to generate a query for each different geographic area of the global network and/or network that is part of the global network.

According to some configurations, the user 138 and/or the NMS 102 may associate metadata with the network graph. As an example, the NMS 102 may annotate the network graph to indicate network capacity, metadata, state, relationships between the connected nodes, and the like. The NMS 102 may also generate subgraphs for portions of the global network, such that cloud, or stand-alone local networks can be imported/exported and merged into the global network. For instance, the user 138 may request that a graph be generated of a stand-alone network (e.g., external network 116A), that the user wants to add to the global network. After generating the network graph, the user 138 may utilize the GUI, CLI, and/or the API to connect the stand-alone network to the global network.

As illustrated in FIG. 1, the user 138 has created a global network that spans three regions 118 including VPCs 112 and connects external networks 116. As briefly discussed above, the user 138 may utilize a UI 136, API(s) 140, or some other mechanism to configure and manage a global network. As a particular example, assume that user 138 has utilized UI 136 to configure and manage the global network as illustrated in FIG. 1. Using the UI 136, the user 138 may select network resources to include within the global network. For instance, the user 138 may utilize a GUI to define that network 118A associated with a first geographic location, which may be referred to herein as a "network", includes VPC 112A, VPC 112B, and VPC 112C connected using a gateway 106A that are connected to resources 114A in external network 116A using external connector 108A.

As used herein, a "gateway" is a gateway service that enables users to connect Virtual Private Clouds (VPCs) 112 and stand-alone networks, such as external networks 116 across different geographic locations/areas and the cloud. As a company grows and the global network grows, a gateway makes it easier for managing point-to-point connectivity across many different VPCs 112 and external networks 116, with the ability to centrally manage connectivity policies. As illustrated, the user 138 may also attach a VPN 110A to a gateway 106A that is connected to the VPCs 112A-112C, without requiring the user 138 to attach a VPN 110 to each VPC.

Generally, a gateway 106 acts as a hub that controls how traffic is routed among the connected networks. According to some configurations, the gateway 106 utilizes a hub and spoke model, where the spokes connect the hub to the different VPCs 112 and/or VPNs 110. Any new VPC 112 added is simply connected to the gateway 106A and is then automatically available to every other network that is connected to the gateway 106A. In various examples, the routing/forwarding of network packets from one attached stand-alone network to another stand-alone network (e.g., VPC 112A to VPC 112B) is managed by one or more gateways 106 based on metadata and/or policies provided by the users. According to some examples, the gateways may be created using AWS® Transit Gateway.

In some configurations, the NMS 102 may expose functionality for incorporating an existing network into a global network. For instance, the user 138 may access a graph that represents network 118C and select an option within the UI 136 and/or programmatically through an API 140 that adds network 118C to the global network. According to some examples, the gateway 106D that connects the different networks 118A, 118B, and 118C may be added in response to a command received from a user and/or automatically in response to connecting a network being added to the global network. In the current example, the network 118C includes VPC 112H, VPC 112I, and VPC 112J connected using a gateway 106C that are connected to resources 114C in external network 116C using link 142 and external connector 108C. Gateway 106D connects network 118A to network 118C.

As another example, the user 138 may utilize a CLI to generate the representation of network 118B. In the current example, the network 118B includes VPC 112D, VPC 112E, VPC 112F, and VPC 112G connected using a gateway 106B that are connected to resources 114B in external network 116B using VPN 110B and external connector 108B. Gateway 106D connects network 118B to network 118C, and network 118A. See FIGS. 5A-5E and related description for example GUIs for configuring and managing a global network.

Networks 118 may have different resources 114 and connections. For example, network 118A may comprise a set of resources 114 at a data center or premise external to the service provider network's own data centers, which may be linked to the service provider network 104 using VPN 110 (virtual private network) tunnels or connections that utilize portions of the public Internet. Network 118C may also comprise resources 114C at premises outside the service provider network 104, connected to the service provider network 104 via dedicated physical links (which may be referred to as "direct connect" links), such as link 142, in the depicted example. The networks 118 may also include one or more virtual networks, such as VPCs 112, set up using resources located at the provider network's data centers. A virtual network may comprise a collection of networked resources (including, for example, virtual machines) allocated to a given client of the service provider network 104, which are logically isolated from (and by default, inaccessible from) resources allocated for other clients in other virtual networks. The client on whose behalf a virtual network is established may be granted substantial flexibility regarding network configuration for the resources of the virtual network (e.g., private IP addresses for virtual machines may be selected by the client without having to consider the possibility that other resources within other virtual networks may have been assigned the same IP addresses, subnets of the client's choice may be established within the virtual network, security rules may be set up by the client for incoming and outgoing traffic with respect to the virtual network, and so on). Similar flexibility may also apply to configuration settings at VPN-connected external networks such as external network 116A and external network 116B, and/or at external networks 140C connected via dedicated links, such as link 142, to the service provider network 104.

As briefly discussed above, the user 138, or some other device/component/service, may also utilize the UI 136, the API(s) 140, or some other input mechanism (e.g., speech) for the configuration and management of a global network. For instance, the user 138 may configure monitoring of different events and alarms and based on an occurrence of an alarm and/or an event perform an event-driven configuration (e.g., using AWS® Lambda) that automatically reacts to network changes quickly and provides the user with tools to automatically reconfigure their global private networks to mitigate impacts without human intervention.

In some examples, the user might also utilize the UI 136, API 140, and/or CLI exposed by the NMS 102 to configure metrics/events to be monitored, tasks/workflows to be performed (e.g., based on an occurrence of an event and/or a triggering of an alarm), and the like. In some configurations, the NMS 102 may also perform operations on behalf of the user, such as health monitoring, reachability monitoring, and the like (See FIG. 2 and related discussion for more details). Additional details regarding the various components and processes described briefly above for configuring and managing global private networks will be provided below with regard to FIGS. 2-12.

Figure 2:
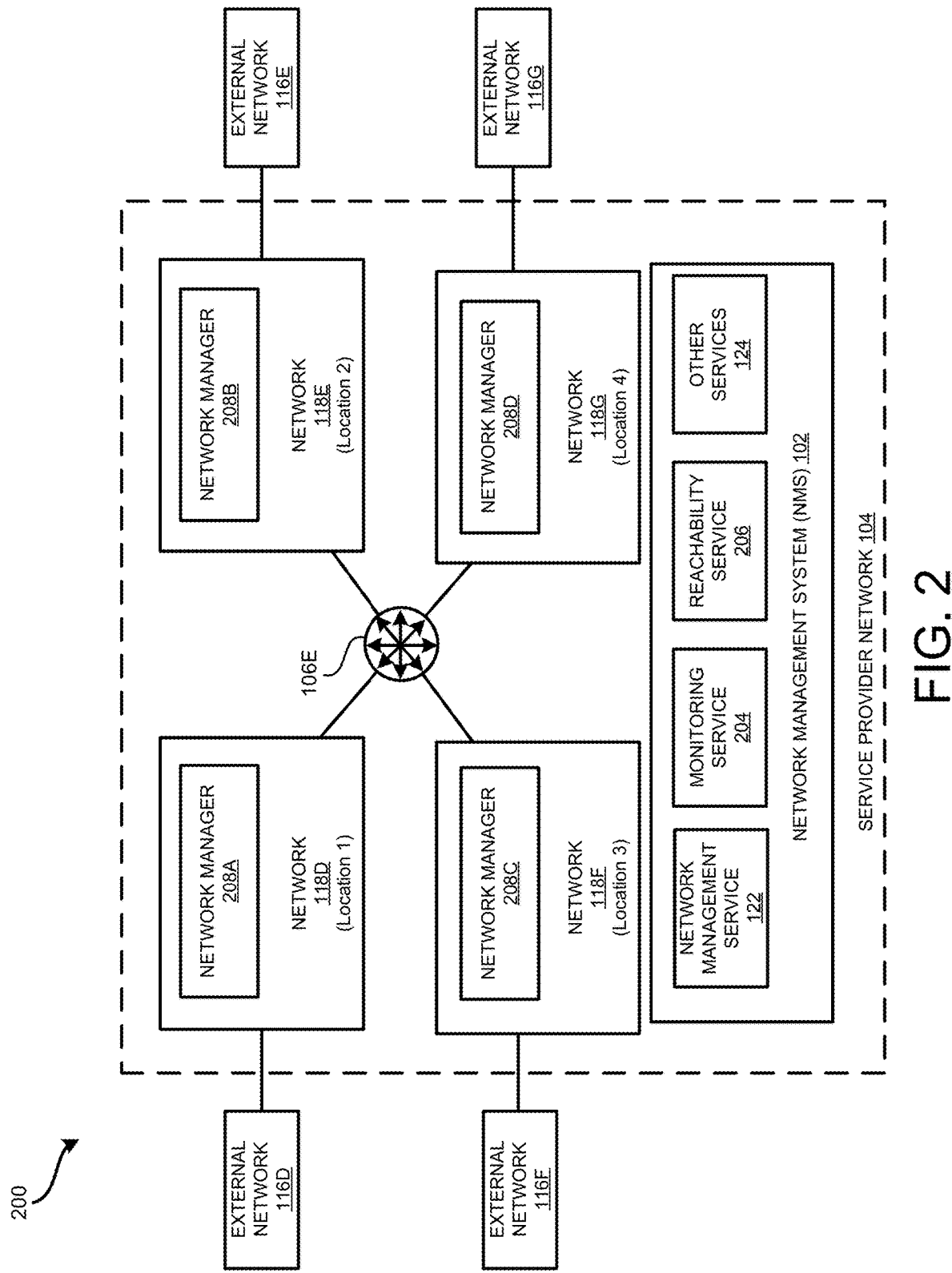
FIG. 2 is a software and network architecture diagram showing aspects of a network management system (NMS) interacting with different networks of a global network.

FIG. 2 is a software and network architecture diagram showing aspects of a network management system (NMS) 102 interacting with different networks 118 of a global network. FIG. 2 is similar to FIG. 1 in that it shows networks 118 that span different geographic locations but includes further details regarding performing reachability analysis and monitoring of resources within the networks 118.

In the example illustrated by FIG. 2, the global network includes four networks 118D-118G. For example, network 118D may include one or more data centers in a country C1 (or territory, area, etc.), network 118E may include one or more premises in country C2, network 118F may include locations in state S1 of country C3, and network 118G may include resources in states S2 and S3 of country C3. In response to data received via the UI 136, the CLI, and/or the API(s) 140, the global network may be generated and set up within each of the specified geographic areas/locations/regions. Furthermore, in the depicted example, the user may also have configured one or more external networks 116, such as 116D-116G, at premises outside the service provider network's data centers to be part of the global network. As discussed above, such external networks 116 may be connected to the service provider network 104, for example, using VPNs 110 or dedicated physical links 142 as discussed earlier.

In order to manage the routing of network traffic in a scalable manner between resources in various of the internal and external isolated networks, one or more gateways, such as gateway 106E, can be utilized. The gateway 106E, and gateways 106 included in the networks 118, provide network pathways or links that may be used to enable packets to flow at desired levels of performance and availability. In many cases, there is more than one path between network endpoints. The paths of the global network within the service provider network 104 may be provisioned and managed (e.g., by adding/acquiring new fiber optic or other types of physical links, upgrading or otherwise changing the links and/or devices used) by the service provider network operator without obtaining input from clients. According to some examples, the NMS 102 configures the pathways that connect the gateways 106 on behalf of the user 136. For example, the client may submit a programmatic request using the API(s) 140 indicating a set of stand-alone networks that are to be connected to one another using gateways 106, and the network management service 122 may configure the region-level gateways as well as one or more cross-region gateways, such as gateway 106E. In some examples, the user 138 may not even have to request the establishment of individual ones of the gateways. The user experience may thereby be made much smoother or easier than if the user 138 had to issue multiple programmatic requests.

As illustrated, FIG. 2 shows network 118D including external network 116D, network 118E including external network 116E, network 118F including external network 116E, and network 118G including external network 116G, coupled via gateway 106E. The NMS 102 includes network management service 122, monitoring service 204, reachability service 106, and other services 124. Each network 118 includes a network manager 208 configured to perform operations relating to the configuration and management of the global private network. In some configurations, the network managers 208 are configured to interact with the different services exposed by the NMS 102.

As briefly discussed above, the reachability service 206 of the NMS 102 may perform static and/or dynamic network reachability monitoring to assist the user 138 in identifying possible problems with connectivity between different endpoints within a global network. Managing network reachability can be difficult in large, complex networks that span across both stand-alone networks and the cloud, as the monitoring and analysis of the reachability depends on the correct configuration of many resources and networking devices. Further, the global network may include firewalls, security groups, access control lists (ACLs)/network access control lists (NACLs) that are configured to block/allow traffic to flow between different network endpoints. According to some configurations, the reachability service 206 of the NMS 102 is configured to manage the monitoring of the different networks, the connectivity between the networks, and identify problems in network reachability between different network endpoints.

In some examples, the NMS 102 may receive information from the network managers 208 of the different networks 118 and provide the data to the reachability service 206 to determine reachability between different endpoints. For example, the NMS 102 may receive events data from a network 118 that a network change has been made (e.g., a device added/removed from the global network, setting(s) have been changed, . . . ) and/or metrics data that is associated with performance of the network (e.g., performance of a gateway and/or some other node within the global network). The NMS 102 may also transmit instructions to the network managers 118 to perform monitoring of one or more computing resources and/or network resources within the associated region.

According to some configurations, a user 138 may define what endpoints to monitor. For instance, the user 138 may specify one or more policies that define what network endpoints to monitor for reachability. As an example, the user 138 may specify policies that are positively stated, such as "VPC A can reach stand-alone network in CIDR range X" or negatively stated, such as "VPC D cannot reach VPC E". The user 138 may also specify what events to utilize in determining when to perform static/dynamic reachability analysis. For example, the reachability service 206 may perform static analysis in response to a change being made to the global network and perform dynamic analysis at some specified period (e.g., every minute, five minutes, . . . ). In some configurations, the reachability service 206 may monitor each of the different network endpoints defined within the global network for reachability. This makes network management and configuration easier and less error-prone since the user does not have to individually access each network and analyze a flow of data between the networks.

In some examples, users may specify to determine network connectivity for different endpoints within the network (e.g., monitor whether two points in a network, A and B, can or cannot reach each other). One or more alarms may be configured to trigger in response to a value of metric being out of range, exceeding a specified value, below a specified value, and the like. According to some examples, the monitoring service 204, and the reachability service 206 may monitor various network resources/parameters.

In some configurations, the monitoring service 204 is configured to obtain metrics data and/or event data from the networks 118. Generally, metrics data includes metrics that identify a performance of a computing resource and/or a network element. For example, the monitoring service 204 may instruct a network manager 208 to monitor, collect and store metrics data from various network resources, applications, and services operating in the network 118. In some configurations, the monitoring service 204 collects specified and/or default metrics relating to use of resources. For example, each region may collect metrics data relating to CPU utilization, data transfer, disk usage, memory usage, bandwidth utilized, latency, and the like.

In some examples, the monitoring service 204 collects metrics associated with gateways 106. For example, the metrics may include the number of bytes received by the gateway, The number of bytes sent from the gateway 106, the number of packets received by the gateway 106, the number of packets sent by the gateway 106, the number of packets dropped by a gateway 106, the number of packets dropped by a gateway 106 because they did not match a route, and the like. According some configurations, the metrics may also include the number of bytes sent to each connection of the gateway 106, the number of packets received by each connection of the gateway 106, the number of packets sent by the gateway 106 to each connection of the gateway, and the like. As such, the user 138 may monitor metrics associated with an overall performance of a gateway 106, as well as performance of a gateway 106 with each connection of the gateway 106.

In some configurations, the monitoring service 204 may collect metrics for VPNs 110, such as a state of the tunnel, a number of bytes received through a VPN tunnel, bytes sent through the VPN tunnel, and the like. The VPN metrics may be aggregated per VPN tunnel and per VPN connection. According to some examples, the monitoring service 204 may also collect metrics for VPNs 110 such as a number of down tunnels terminated on a device, a number of bytes received through a device or link, a number of bytes sent through a device or link, and the like. The metrics may be aggregated by device and/or by link.

According to some examples, different events may be published by one or more services, such as by network management service 122 and/or other services 124. For instance, in some configuration, the following events may be published a network topology change, a routing update, a network status change, a gateway attachment created, a gateway 106 attachment deleted, a gateway 106 added, a gateway 106 deleted, a route/path created in a gateway 106 route table, a route deleted in gateway 106 route table, a route replaced in gateway 106 route table, a VPN 110 connection created, a VPN 110 connection deleted, VPN 110 connection's gateway 106 changed, a VPN 110 tunnel's IPSec session went down, a VPN 110 tunnel's IPSec session is now up, a VPN 110 tunnel's session went down, a VPN 110 tunnel's session is now up, a VPN 110 tunnel's endpoint instance replaced, a route added for VPN 110 connection, a route removed for VPN 110 connection, and the like.

The monitoring service 204 may obtain the data from the different networks 118D and utilize this data to monitor operational performance, troubleshoot issues, and spot trends within each of the different networks 118 forming the global network.

For instance, each network manager 208 may be configured to collect data for the gateways 106. For instance, the bandwidth usage between the VPCs 112 and a VPN 110 connection, packet flow count, packet drop count, and the like may be monitored. In some examples, information on the IP traffic routed through a gateway may also be monitored. According to some configurations, the network management service 122, the monitoring service 204, and/or the reachability service 206 collects this data in form of logs and metrics. This allows a user to access the metrics data and reachability data from a single location rather than having to access each network in order to obtain the metrics data and reachability data for the entire global network. Instead of monitoring individual systems and applications in silos (server, network, database, etc.), the different components of the global network may be monitored as a complete stack (e.g., applications, infrastructure, and services). This data may be then be used the network management service 122, the monitoring service 204, the reachability service 206, and/or some other service 124 to trigger alarms, create logs, and generate events that may be used to perform automated tasks (e.g., take a corrective action, provide warnings to a user 138 via the UI 136, . . . ). Being able to access the data from a single location may reduce the Mean Time to Resolution (MTTR) to address a problem that is detected or identified within the network.

A number of different types of metrics may be utilized, including for example latency metrics associated with individual ones of the network pathways between networks, bandwidth metrics associated with individual ones of network pathways, packet loss metrics associated with individual ones of the network pathways, or flow count metrics associated with individual ones of network pathways. In some examples, a user 138 may be provided indications of pathways that are available for inter-region traffic between stand-alone networks (e.g., the user may be informed that some paths pass through country C1, others pass through countries C2 and C3, and the like). In some configurations, the user 138 may be provided metrics for inter-region traffic (e.g., total number of packets transmitted between networks 118, latencies for packets sent between different endpoints, and the like.

As discussed above, the NMS may be configured to perform static reachability analysis and/or dynamic reachability monitoring to determine network reachability between endpoints and policy-based reachability to simplify the network monitoring and management. In some examples, the reachability service 206 may utilize formal methods, or some other verification technique, to determine whether the network is configured properly such that network endpoints are reachable. For instance, the user 138, or some other user associated with the service provider network 104, or some other authorized user may generate mathematical models that model a global network. The reachability service 206 may apply these formal methods in response to changes being made to the global network and/or at a request of the user 138 and/or by some other service, device, or component. In this way, if the user requests a change to the global network that would result in a loss of network connectivity, the NMS 102 may provide this information and/or recommendations to correct this detected loss of connectivity.

The monitoring of the global network allows a user 138 of the service provider network 104 to gain actionable insights that help the user 138 optimize application performance, manage resource utilization, and understand system-wide operational health of the global network. In some configurations, the NMS 102 may utilize monitoring service 204 for collecting, aggregating, and summarizing compute utilization information like TWAMP data, CPU, memory, disk, and network data, as well as diagnostic information network reachability between various endpoints, to help the user 138 isolate network issues and resolve the issues quickly. In some examples, the network management service 102 may perform a self-correcting action (e.g., by executing one or more workflows) in response to an alarm triggered by metrics data or monitoring data.

Figure 3:
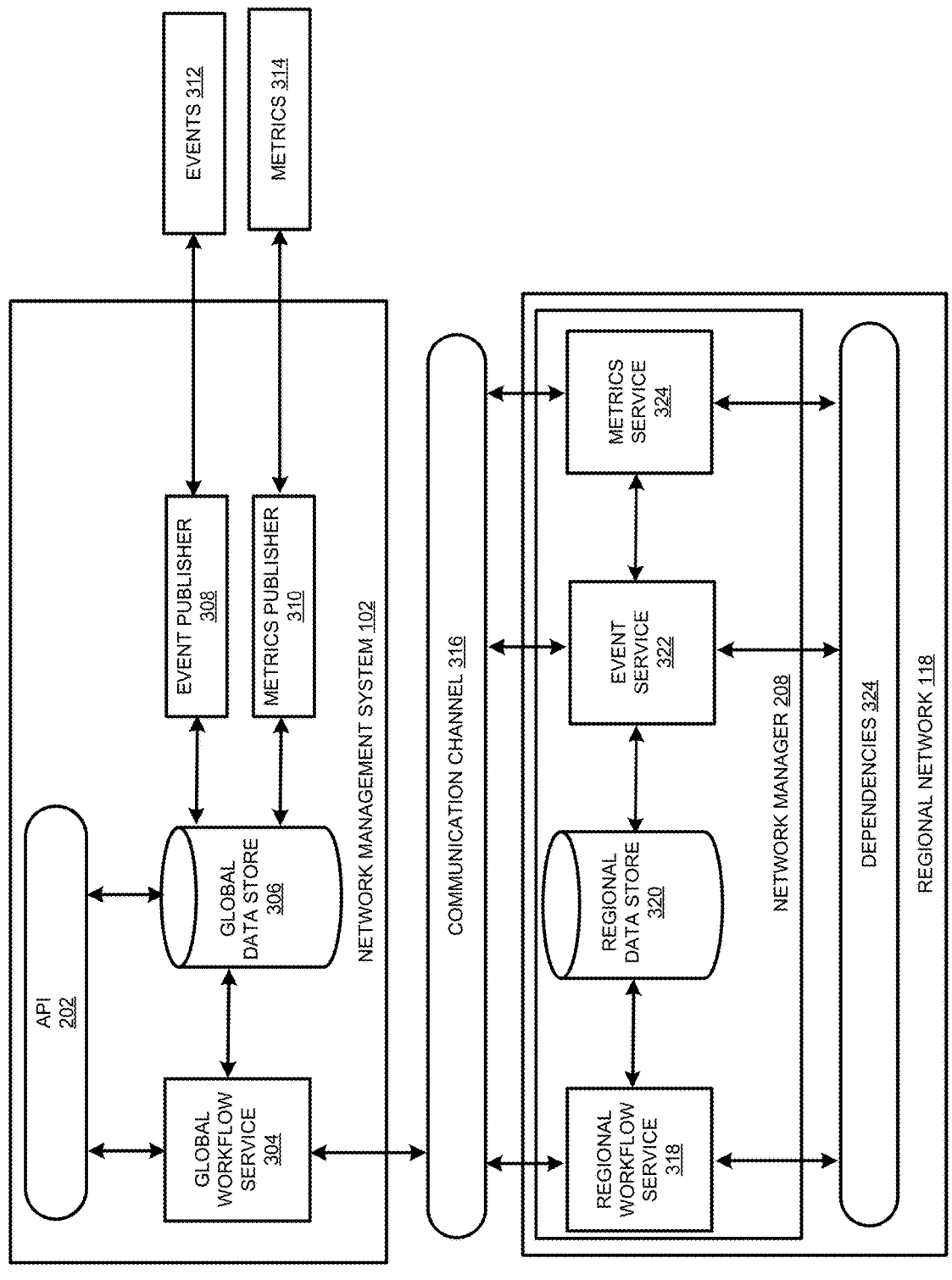
FIG. 3 is a software and network architecture diagram showing aspects of communication between a network and an NMS.

FIG. 3 is a software and network architecture diagram 300 showing aspects of communication between a network 118 and an NMS 102. It is to be appreciated that the environment 300 is merely illustrative and that the various configurations disclosed herein can be utilized in many different types of computing environments.

In the example illustrated in FIG. 3, the NMS 102 includes an API 302, a global workflow service 304, a global data store 306, an event publisher 308 to publish events 312, and a metrics publisher 310 to publish metrics 314. The NMS 102 communicates with a network manager 208 of the network 118 via the communication channel 316. As illustrated, the network manager 208 includes a regional workflow service 318, a regional data store 320, an event service 322, and a metrics service 324. The NMS 102 and the network manager 208 may utilize a different number of components according to other configurations.

According to some examples, the API 302 may be configured to expose functionality for interacting with the NMS 102 for configuring and managing global networks that span across different geographic locations/areas/regions. As discussed above, the API 302 may be utilized by the user 138 to specify parameters associated with the configuration and management of the global network. The API 302 may also be configured to interact with the network management service 122, and other services 124 of the service provider network 104, such as a metrics service 324, and an event service 322.

According to some configurations, communication takes place between the NMS 102 in the service provider network 104 and each region. In these configurations, a network manager 208 in one location does not directly communicate with another network manager 208 that is located in a different location. In other configurations, network managers 208 may communicate with each other.

In some examples, the global data store 306 is configured to store data associated with the global networks associated with different users. The regional data store 320 is configured to store data associated with the network resources that are located within a particular geographic area. The data stores may include one or more databases for storing different types of data, such as a SQL database, a not only SQL (NoSQL) database, a graph database, and the like.

The global workflow service 304 and the regional workflow service 318 provide functionality associated with performing actions relating to workflows. The global workflow service 304 and the regional workflow service 318 provide functionality for performing different tasks and managing intertask dependencies, scheduling, and concurrency in accordance with the defined logical flow. For instance, the global workflow service 304 and/or the regional workflow service 318 may be implemented using AWS® Lambda and AWS® Step Functions, AWS® Simple Workflow service, and the like. Generally, the workflow services may execute code and access different computing resources, such as computing resources 120 in the service provider network 104 and/or resources 114 included in one or more stand-alone networks 116, or other networks.

The event service 322 is configured to receive and identify different events. For example, the event service 322 may be configured to identify changes in a network, such as changes in a gateway, changes in VPN, and the like. As discussed above, the events may include events such as but not limited to network topology changed, routing updates, network status changed, gateway 106 updates (e.g., attachment created/deleted, gateway 106 added/deleted, route/path altered in a gateway 106 route table, . . . ), VPN 110 updates (e.g., VPN 110 connection created/deleted/changed, VPN 110 tunnel changes, . . . ), and the like. According to some configurations, the event service 322 identifies the changes based on data generated by the metrics service 324, the reachability service 206, and/or some other service, device or component. In some examples, the event service 322 is a service that runs code without provisioning or managing servers (e.g., AWS® Lambda).

The metrics service 324 is configured to generate metrics that may be utilized by the NMS 102 and/or the user 138. In some configurations, the metrics service 324 may utilize one or more services provided by the service provider network 104. The metrics service 324 collects metrics from network resources, and applications to monitor operational performance, troubleshoot issues, and spot trends within the global network.

Figure 4:
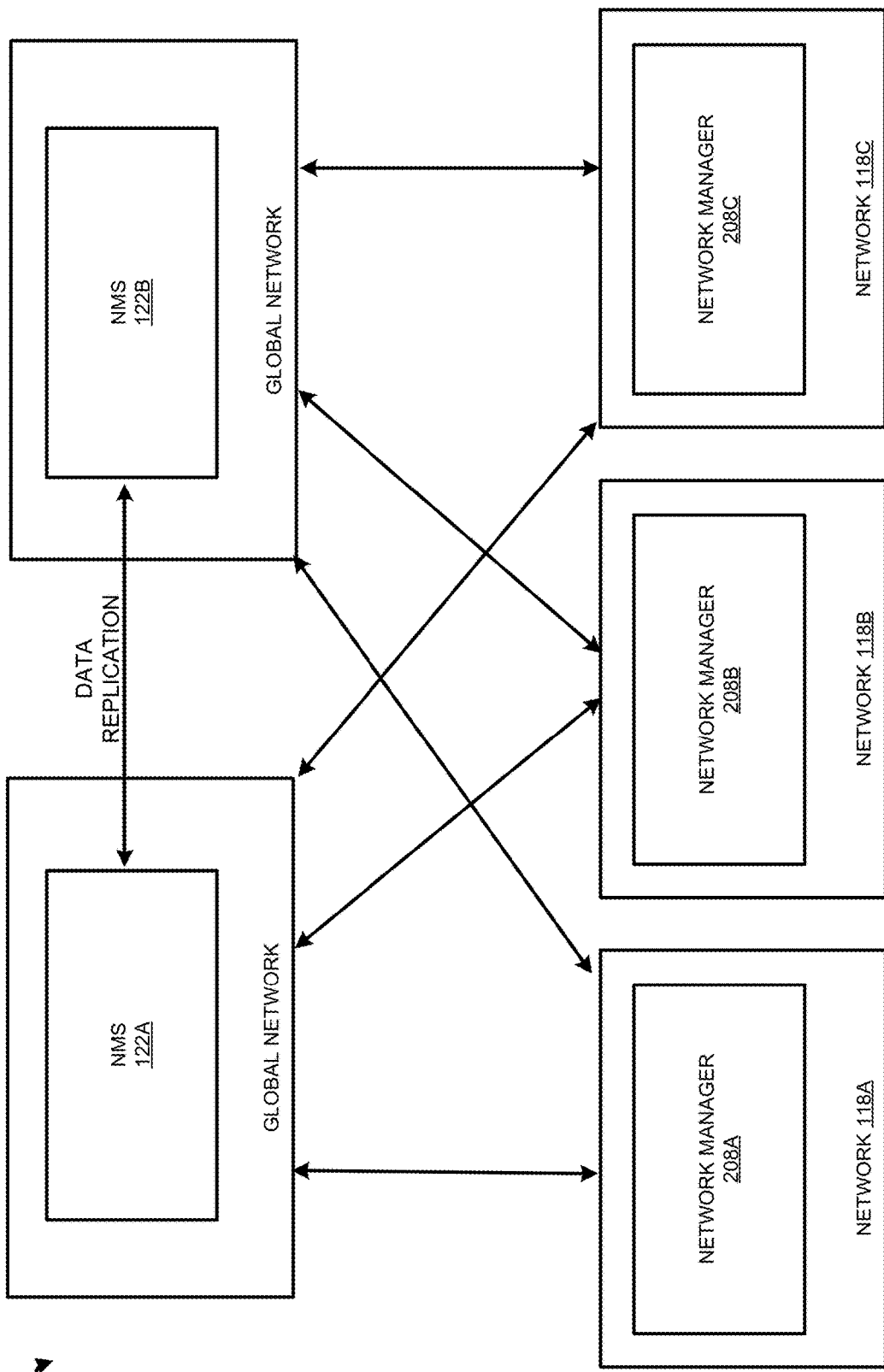
FIG. 4 illustrates an example system diagram in which networks may be linked using redundant pathways.

FIG. 4 illustrates an example system environment 400 in which networks 118 may be linked using redundant pathways. As illustrated in FIG. 4, networks 118 are redundantly connected to more than one instance of NMS 122. For example, each of the networks 118A, 118B, and 118C may be connected to both NMS 122A and NMS 122B within the global network. NMS 122A and NMS 122B may be located in different geographic regions and/or in the same geographic region. Further, the networks 118 may be connected to more than two instances of NMS 122. According to some examples, data between the NMS 122A and NMS 122B are replicated. In this way, in case an NMS 102 goes down (or is experiencing issues that affect performance), the redundant NMS may provide services to the networks 118.

FIGS. 5A-5E are diagrams showing exemplary graphical user interfaces for configuring and management of scalable global private networks. In some examples, the user configures and manages a global private network using a graphical user interface (GUI). In other examples, the user may use a command line interface, or utilize an Application Programming Interface (API). FIGS. 5A, 5B, 5C, 5D, and 5E illustrates example graphical user interfaces 500, 520, 540, 570, and 592 where the user 138 can configure and manage scalable global private networks. In some instances, the NMS 102 may provide data for displaying a GUI to a display associated with the user computing device 138.

Figure 5A:
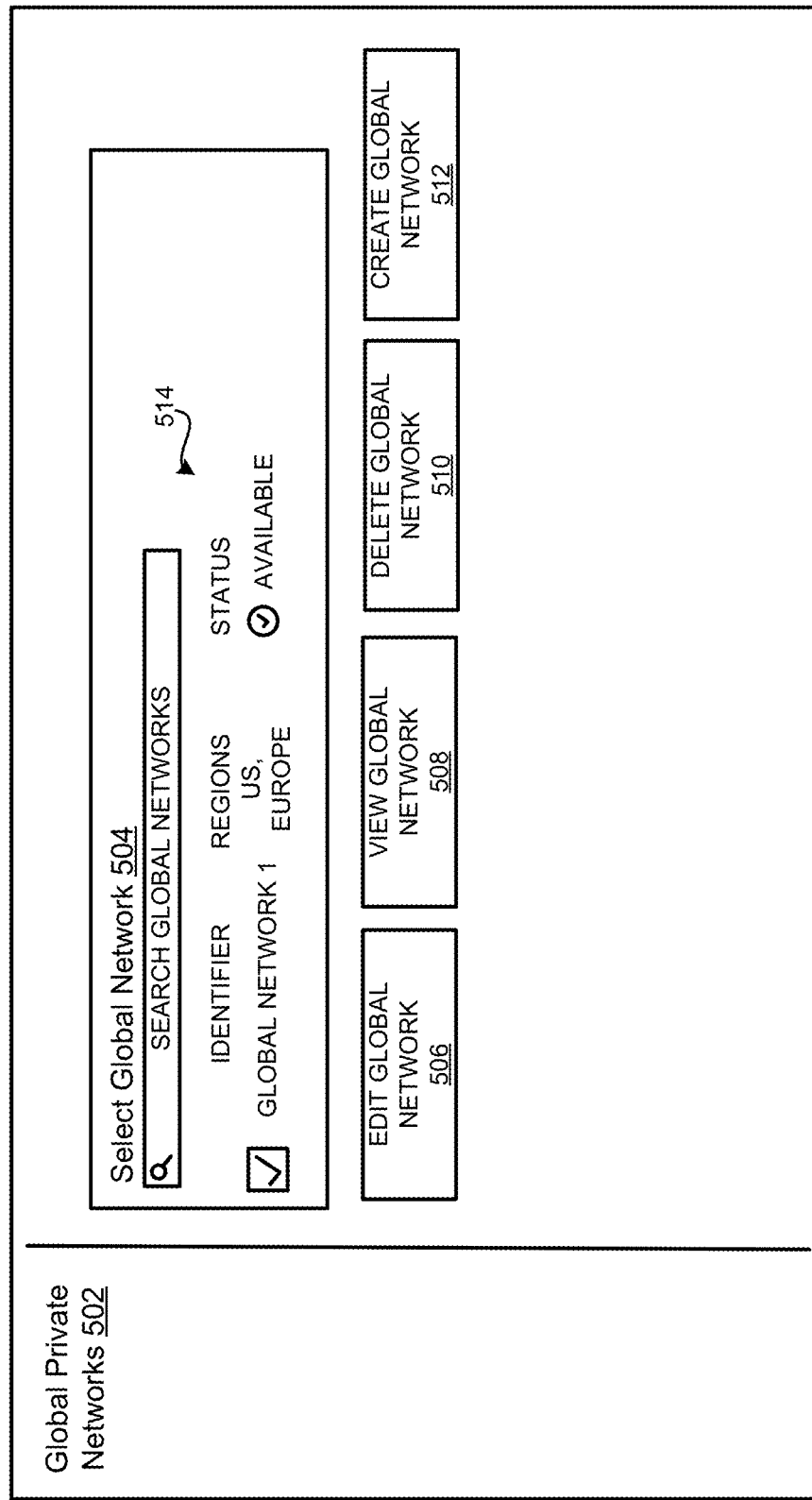
FIG. 5A is a diagram showing an exemplary graphical user interface for configuring and managing a scalable global private network.

In the example illustrated in FIG. 5A, GUI 500 shows user interface (UI) elements for selecting a global network. More or fewer UI elements may be included within GUI 500. As illustrated, the GUI 500 includes a search global network UI element 504 to enter a search term to locate a defined global network. An edit global network UI element 506 may also be provided that, when selected, is used to edit a global network. For instance, the user 138 may select "Global Network 1" as indicated by indicator 514.

GUI 500 also includes a view global network UI element 508 to view a global network. For example, selecting the view global network UI element 508 may cause a graph of the global network to be displayed (See FIGS. 5D and 5E for example graphs of a global network). Create global network UI element 512 may be used to delete a previously created global network. Delete global network UI element 510 may be used to delete a previously created global network. For example, selecting the delete global network UI element 510 may cause the selected global network to be deleted.

FIG. 5B shows GUI 520 that includes user interface (UI) elements for registering a gateway 106 to include within a global network. More or fewer UI elements may be included within GUI 520. As illustrated, the GUI 520 includes a gateways UI element 522, a devices UI element 524, a regions UI element 526, a connections UI element 528, and a configuration UI element 530 that may be selected to create, configure and/or edit a gateway 106, devices, regions 118, connections (e.g., VPNs 110, links 142), and/or other configurations relating to a global network.

GUI 520 also includes a search gateway UI element 532 for a user 138 to enter a search term to locate a gateway 106. In the current example, the user 138 has identified three gateways to include within the global network as indicated by indicator 534. GUI 530 also includes a cancel network UI element 536 to cancel registration of a gateway 106 and a register gateway UI element 538 to include one or more gateways 106 as part of the global network.

Figure 5C:
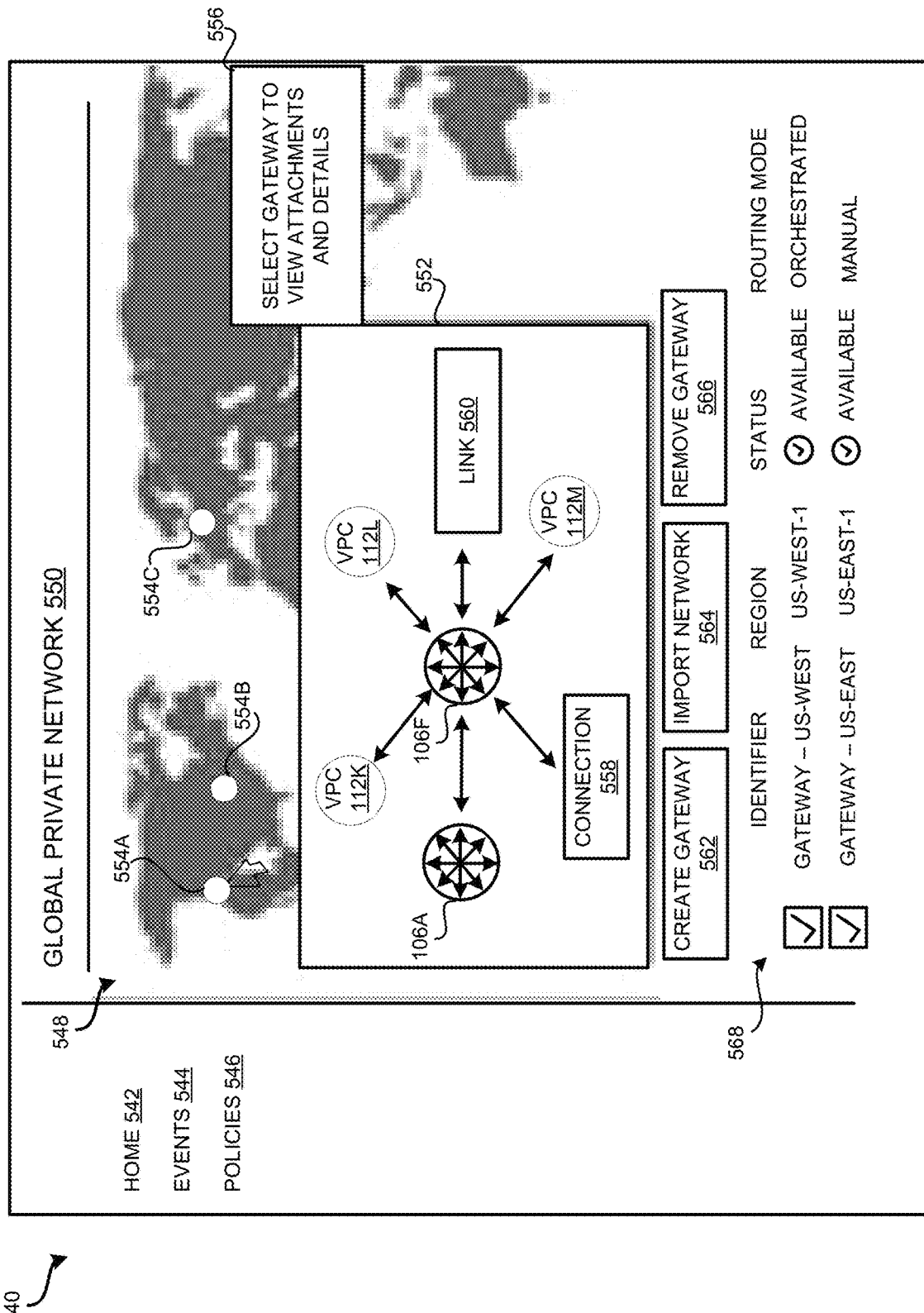
FIG. 5C is a diagram showing an exemplary graphical user interface for viewing information about a gateway within a global network.

FIG. 5C shows GUI 540 that includes user interface (UI) elements for viewing information about a gateway 106 within a global network. More or fewer UI elements may be included within GUI 540. As illustrated, the GUI 540 includes a home UI element 542 to go to a home display, an events UI element 544 to configure alarms, actions, and tasks to perform, and a policies UI element 546 to configure policies for the global network.

The GUI 540 also includes a view of a map 548 that displays a world view that includes gateway UI elements 554A-554C that show different gateways 106 that are part of the global map. UI element 556 provides an indication to the user 138 to select one of the gateway UI elements 554 to obtain details about the gateway 106. In the current example, the user has selected gateway UI element 554A. In response to selection of the gateway UI element 554A, graphical window 552 is displayed. Graphical window 552 includes a graph view that shows the connections of gateway 106F to VPCs 112K-VPC 112M, link 560, connection 558, and gateway 106A. More or less information may be shown within graphical window 552.

GUI 540 also shows a create gateway UI element 562, an import network UI element 564, and a remove gateway UI element 566. Indicator 568 shows additional details relating to gateway 106A and gateway 106F.

Figure 5D:
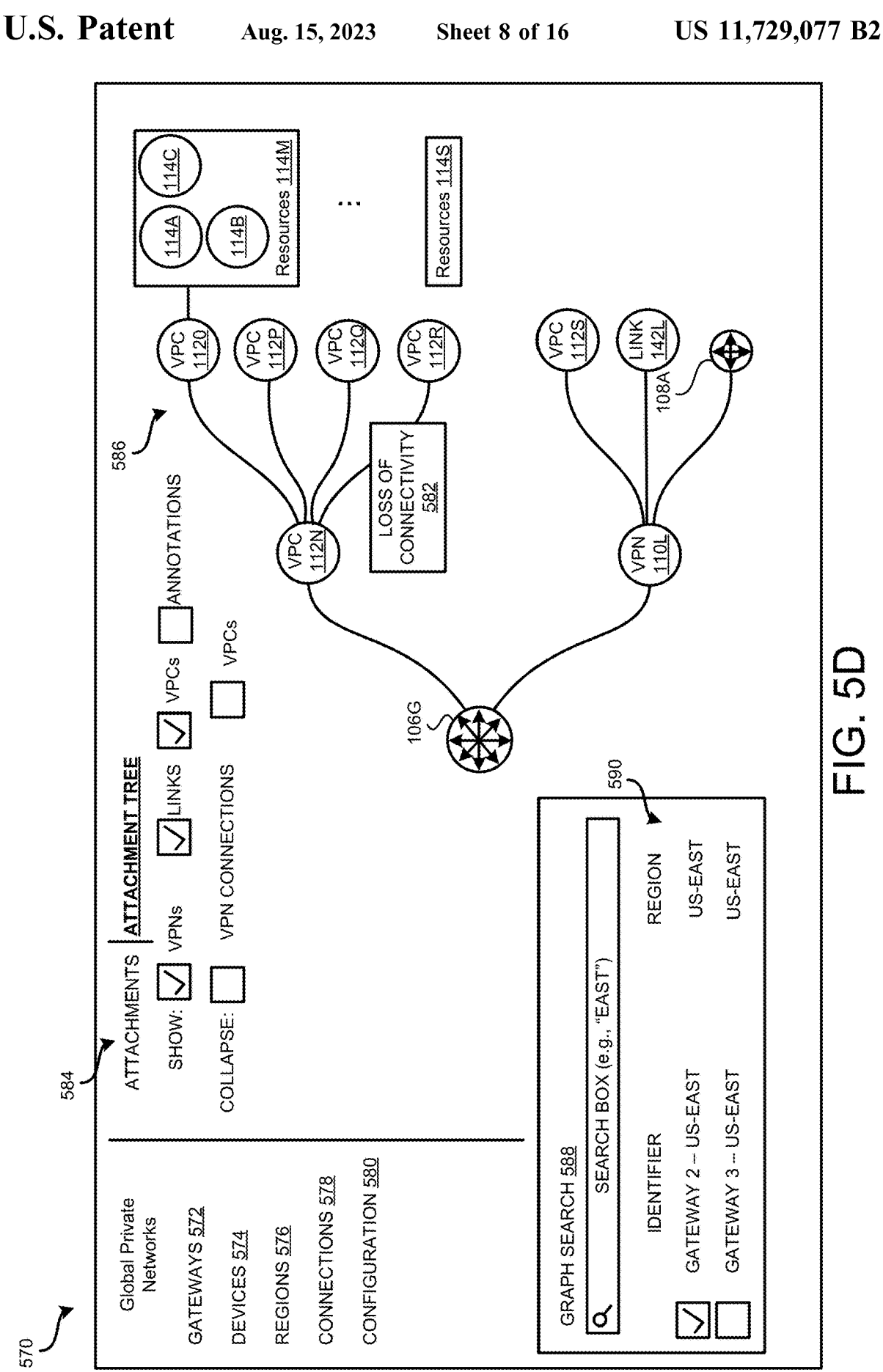
FIG. 5D is a diagram showing an exemplary graphical user interface for viewing a graph representing a portion of the global network and performing a search of the graph.

FIG. 5D shows GUI 570 that includes user interface (UI) elements for viewing a graph representing a portion of the global network and performing a search of the graph. More or fewer UI elements may be included within GUI 570. As illustrated, the GUI 570 includes a gateways UI element 572 selectable to access information about gateways 106 of the global network, a devices UI element 574 selectable to access information about devices of the global network, a regions UI element 576 selectable to access information about networks of the global network, a connections UI element 578 to selectable to access information about connections of the global network, and a configuration UI element 580 selectable to access configuration information about the global network.

The GUI 570 also includes a graph display area 586 that display a connected graph representing a portion of the global network. In the current example, the graph display area 586 shows a portion of a global network connected to gateway 106G. As can be seen, the gateway 106G is connected to a VPC 114N and a VPN 110L. The VPC 114N is connected to VPCs 1140-1140R, which are connected to resources 114M-114S. VPN 110L is connected to VPC 1105, link 142L, and direct connection 108A. The user 138 may identify what to display in the graph display area 586 using selection UI elements 584. For instance, the user 138 has selected to show devices, links, sites. In other examples, the selection UI elements 584 may include other options to show more or fewer details. Similarly, the user 138 may select elements to collapse within the graph. For instance, if the user selected to collapse the VPN connections, then the graph display area may not show the connections to VPN 110L.

GUI 570 also includes a graph search UI element 588 for a user 138 to enter a search term to locate a portion or resource within the graph. In the current example, the user 138 has entered the search term "EAST" in the graph search UI element 590. In response to the search, the network management service 122 has returned two results "GATEWAY 2" and "GATEWAY 3", and the user has selected "GATEWAY 2" to be illustrated within graph display area 586 as indicated by indicator 594.

Figure 5E:
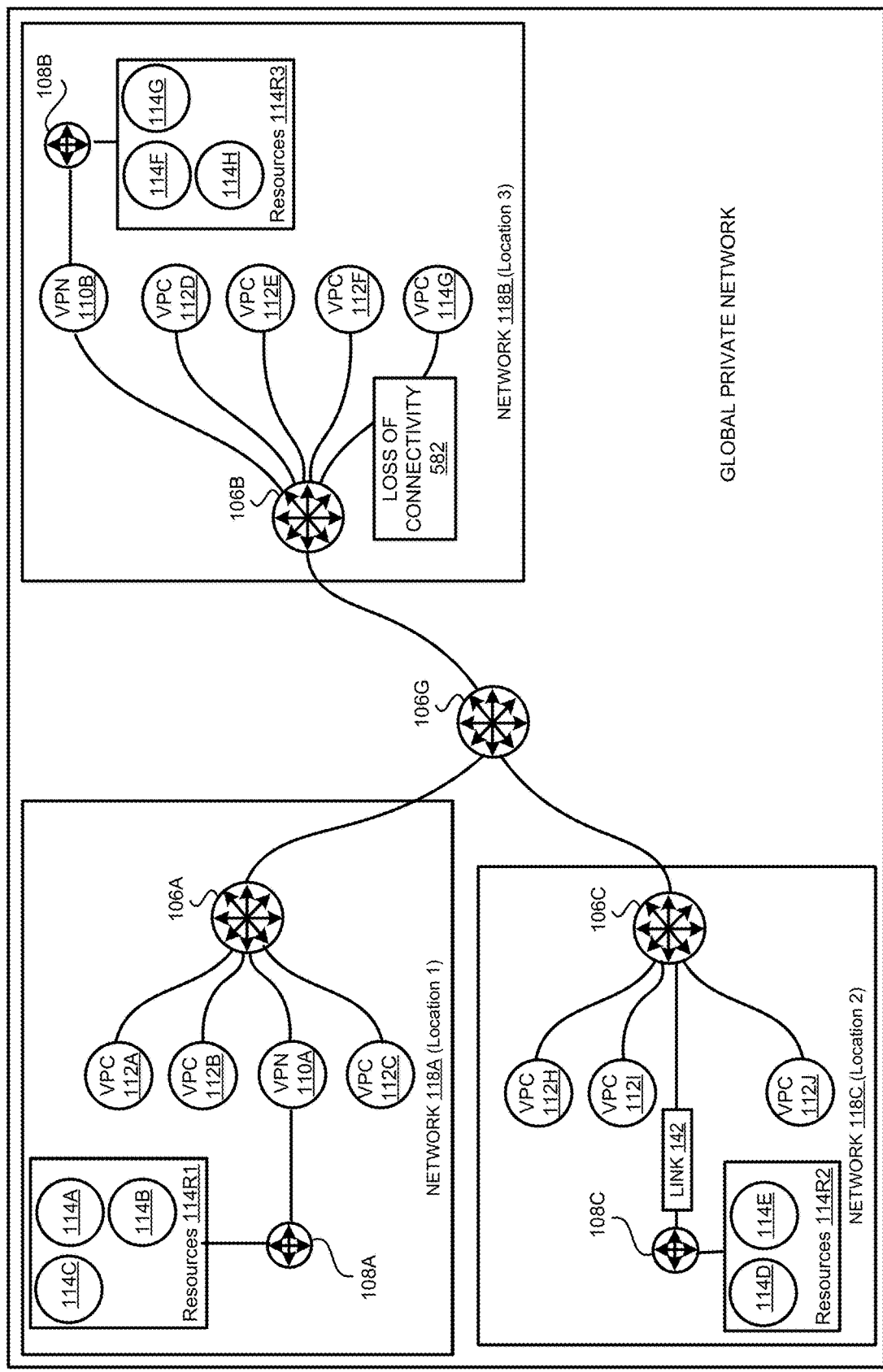
FIG. 5E is a diagram showing an exemplary graphical user interface for viewing a graph representing a global network.

FIG. 5E shows GUI 592 that includes user interface (UI) elements for viewing a graph representing a global network. More or fewer UI elements may be included within GUI 592. As illustrated, the GUI 592 includes UI elements selectable to access information about the global network. The GUI 5920 displays a connected graph representing the global network as illustrated in FIG. 1.

As can be seen, the gateway 106G is connected to network 118A, network 118B, and network 118C. Network 118A includes gateway 106A connected to gateway 106G, VPCs 112A-112C, and VPN 110A. VPN 110A is connected to connector 108A that is connected to resources 114R1 that includes resources (114A-114C) of an external network. Network 118B includes gateway 106B connected to gateway 106G, VPCs 112E-112G, and VPN 110B. VPN 110B is connected to connector 108B that is connected to resources 114R3 that includes resources (114F-114H) of an external network. Network 118C includes gateway 106C connected to gateway 106G, VPCs 112H-112J, and link 142 coupled to connector 108C that is connected to resources 114R2 that includes resources (114D and 114E) of an external network.

As illustrated with regard to FIG. 5D, the user 138 may identify what to display in the graph display area using selection UI elements 584. In the current example of FIG. 5E, the user 138 has selected to show the entire global network. In other examples, the selection UI elements 584 may include other options to show more or fewer details. Similarly, the user 138 may select elements to collapse within the graph.

FIGS. 6-9 are flow diagrams showing illustrative routines 600, 700, 800, and 900 for configuration and management of global scalable networks, according to examples disclosed herein. It should be appreciated that the logical operations described herein with respect to FIG. 6, FIG. 6, FIG. 8, FIG. 9, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

Figure 6:
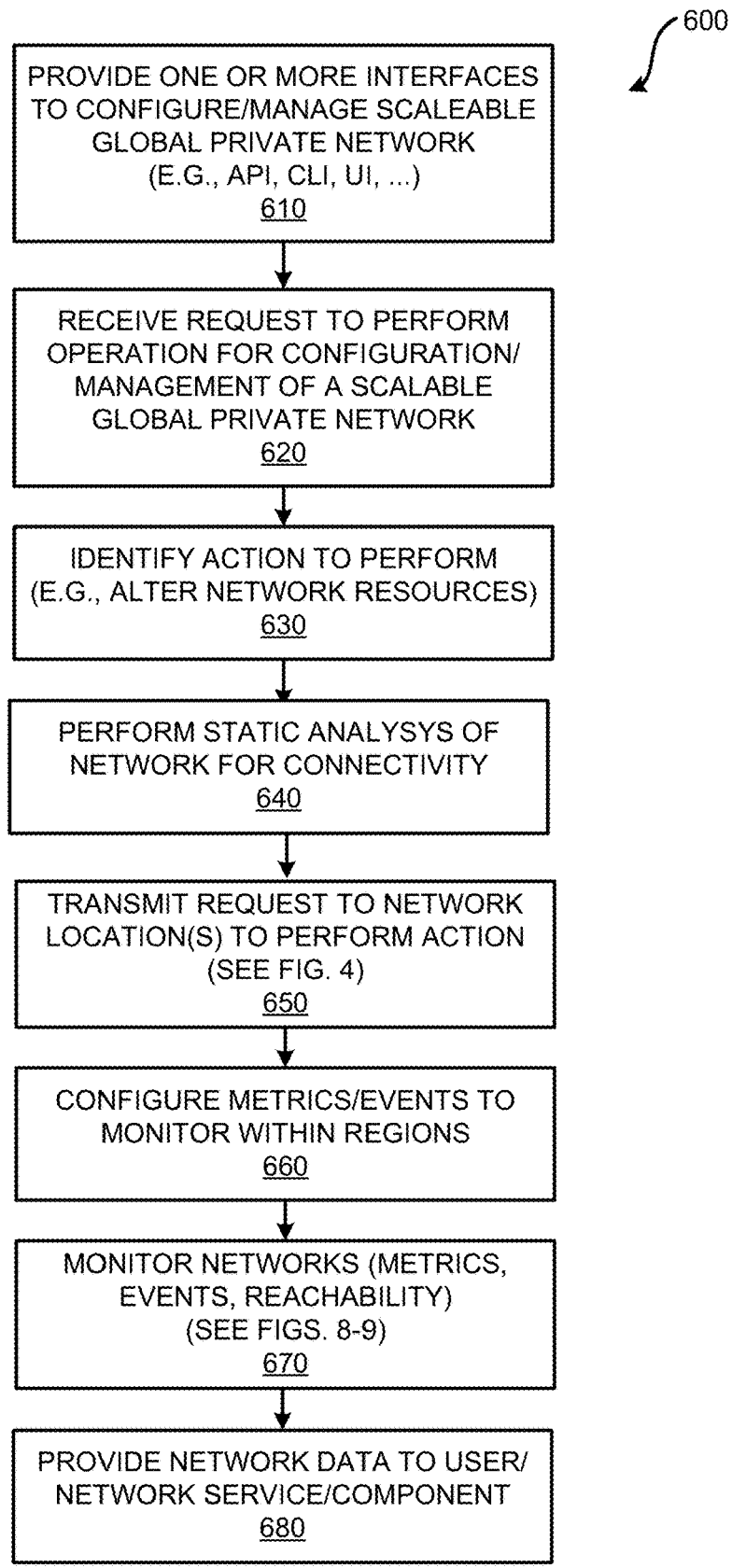
FIG. 6 is a flow diagram showing an illustrative routine for configuration and management of a scalable global private network, according to some examples.

FIG. 6 is a flow diagram showing an illustrative routine 600 for configuration and management of a scalable global private network, according to some examples. The routine 600 may be performed by computing resources 120 associated with the NMS 102 and/or other computing resources, such as computing resources associated with some other network or system.

At 610, one or more interfaces are provided for configuration and management of a scalable global network. As discussed above, the NMS 102 may expose one or more API(s) 140, a CLI, and/or a UI 136, such as a graphical user interface. A user, such as user 138, may utilize the interfaces to configure, view, and manage global networks.

At 620, a request is received to perform an operation for configuration/management of a scalable global private network. For example, the request may be to add a stand-alone network to the current global network, change a policy (e.g., security policy) associated with the network, add a resource to one or more of the networks forming the global private network, configure one or more events and/or actions, configure monitoring, or perform some other action or operation. As discussed above, the request may be received from a user, such as user 138 of a service provider network 104. In some examples, the network management service 122 within NMS 102 receives the request.

At 630, the action to perform is identified. As discussed above, NMS 102 may receive the request and identify the service, component, or device to perform the requested operation. In some examples, the NMS 102 may cause one or more workflows to be performed in response to the request. For instance, the NMS may identify that the request alters the global network, such as an update a security policy, add a resource to a particular region, monitor one or metrics, determine reachability between specified nodes within the global network, and the like.

At 640, static analysis of the global network may be performed. As discussed above, the network reachability service 206 may perform a static analysis using formal methods, or some other verification technique, in response to a request from a user 138 and/or in response to some other event (e.g., a change of network topology). In some configurations, the static analysis may be performed before the network change is implemented. In this way, if a network connectivity issues is detected by the analysis, the user 138 may be provided with data indicating the issue and/or recommendations to correct the issue with network connectivity.

At 650, the request to perform the action is transmitted to one or more of the locations of the global private network. For example, if the request is to change a security policy, the network management service 122 may provide the security policy to the network managers 208 to implement the change within each of the geographic locations and provide the change to the external networks 116 when determined.

At 660, the metrics/events to monitor within the locations of the networks forming the global network are configured. As discussed above, the network management service 122, the event service 322, the metrics service 324, or the reachability service 206 may transmit instructions to the network managers 208, or some other service, device or component, to monitor one or more network resources within the different locations.

At 670, the scalable global private network is monitored. As discussed above, each of the networks at the different locations may monitor events and metrics and provide metrics data and events data back to the NMS 102 for further analysis and/or actions. In some examples, the reachability service 206 utilizes monitoring information from the different locations to identify when there may be a connectivity issue between specified endpoints in the global network. See FIG. 8 and FIG. 9 for additional details.

At 680, network data is provided to a user and/or some other device or component. As discussed above, the NMS 102 may provide data to the user 138 via a UI 136, such as a GUI, and/or use the data to trigger one or more alarms and/or perform one or more workflows.

Figure 7:
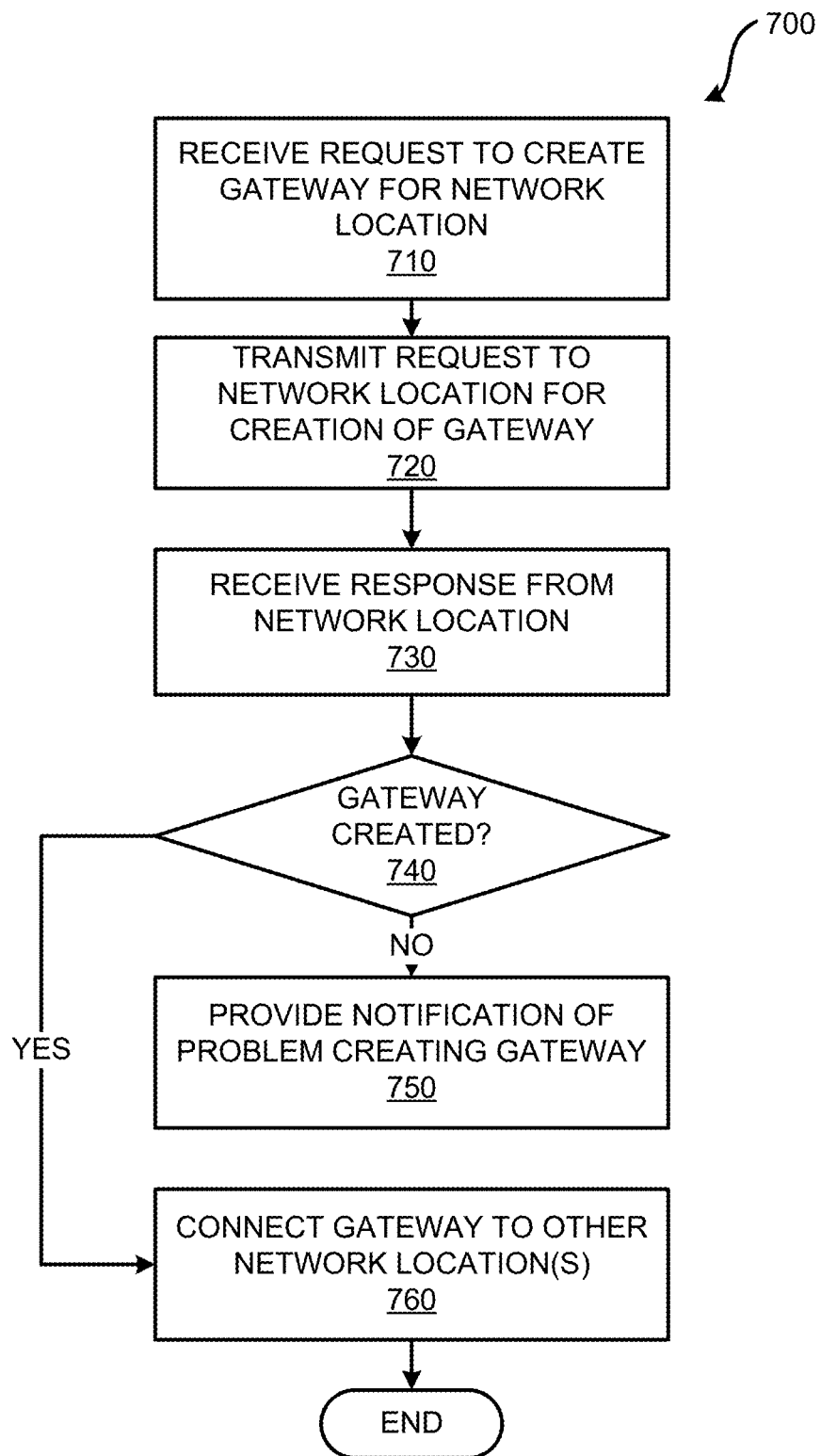
FIG. 7 is a flow diagram showing an illustrative routine for creating a gateway within the global network, according to some examples.

FIG. 7 is a flow diagram showing an illustrative routine 700 for creating a gateway 106 within the global network. The routine 700 may be performed by computing resources 120 associated with the NMS 102 and/or other computing resources associated with the global network. While routine 700 illustrates a request to create a gateway, a similar routine may be performed to perform other actions within the global network.

At 710, a request is received to create a gateway 106 for a particular network location. As discussed above, the user 138 may utilize an API 140, a CLI, or a UI 136 to request to create a gateway 106. In some configurations, the network management service 122 receives the request to create a gateway 106.

At 720, the request to create the gateway is transmitted to the location in which the gateway 106 is to be created. As discussed above, the network management service 122 may transmit the request to a network manager 208 to create the gateway in the network 118.

At 730, a response is received from the region indicating whether the gateway was created and/or whether any problems occurred during the creation of the gateway 106. In some configurations, the network manager 208 transmits a message to the network management service 122 indicating whether the creation of the gateway 106 was successful.

At 740, a decision is made as to whether the creation of the gateway 106 was successful. When the creation of the gateway 106 was successful, the routine moves to 760. When the creation of the gateway 106 was not successful, the routine moves to 750.

At 750, a notification of a problem creating the gateway 106 is provided. According to some examples, the notification may be provided to the user 138 via a UI 136. In other examples, the notification may be provided to a service, component and/or device.

At 760, the gateway may be connected to other regions when determined. For example, the network management service 122 may determine from the request that the gateway 106 is to be connected to one or more other nodes located within one or more other regions.

Figure 8:
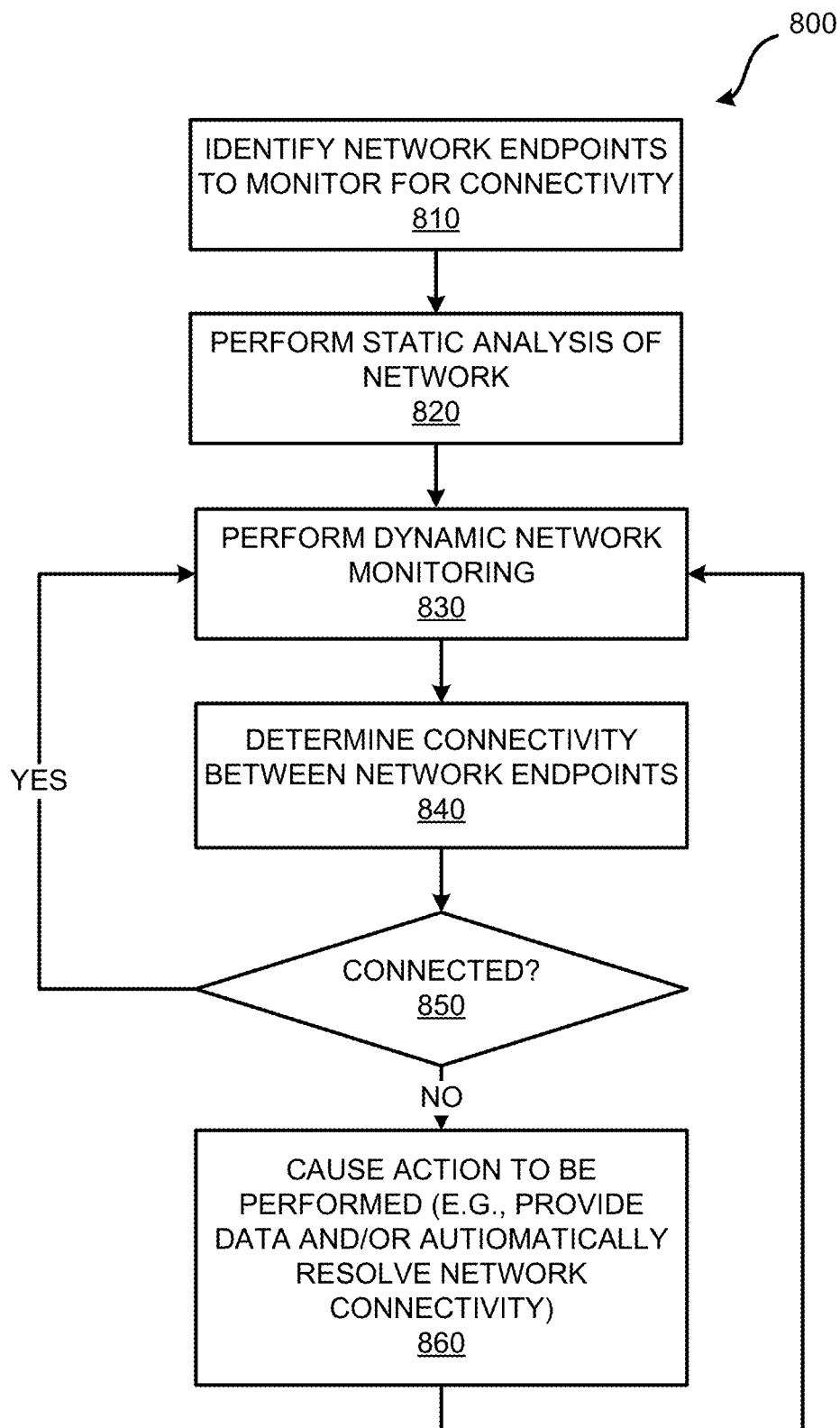
FIG. 8 is a flow diagram showing an illustrative routine for monitoring network endpoints for connectivity, according to some examples.

FIG. 8 is a flow diagram showing an illustrative routine 800 for monitoring network endpoints for connectivity, according to some examples. The routine 800 may be performed by computing resources 120 associated with the NMS 102 and/or other computing resources associated with the global network.

At 810, the network endpoints to monitor for connectivity are identified. As discussed above, the reachability service 206 may identify network endpoints to check for connectivity based on input specified by the user 138 as well as identify other network endpoints to monitor for connectivity, such as gateways 106, VPCs 112, VPNs 110, connectors 108, links 142, and the like.

At 820, static analysis of the global network may be performed. As discussed above, the network reachability service 206 may perform a static analysis using formal methods, or some other verification technique, in response to a request from a user 138 and/or in response to some other event (e.g., a change of network topology).

At 830, the network is dynamically monitored. As discussed above, the reachability service 206, may receive monitoring data, such as events data indicating an occurrence of one or more events and metrics data, from the network managers 208 that may be used to determine connectivity between network endpoints within a region and/or network endpoints that span more than one region. In some examples, the reachability service 206 may perform dynamic network connectivity checks between network endpoints specified by the user 138 as well as other network endpoints, at predetermined times (e.g., every minute, five minutes, . . . ).

At 840, a determination is made as to whether there is connectivity between network endpoints. For example, the reachability service 206 may identify that one or more network endpoints are not reachable and/or that specified network endpoints are reachable.

At 850, a decision is made as to whether the network endpoints have network connectivity. As discussed above, the reachability service 206 may decide whether the network endpoints have network connectivity. When the network endpoints have network connectivity, the routine 800 returns to 820. When the network endpoints do not have network connectivity, routine 800 flows to 860.

At 650, an action is caused to be performed. As discussed above, the reachability service 206 may provide connectivity data to the user 138 via the UI 136 indicating the connectivity issue. The reachability service 206 might also provide the data to one or more other services, devices, or components that in turn execute a workflow to address the network connectivity issue. The routine 800 may end or return to 820.

Figure 9:
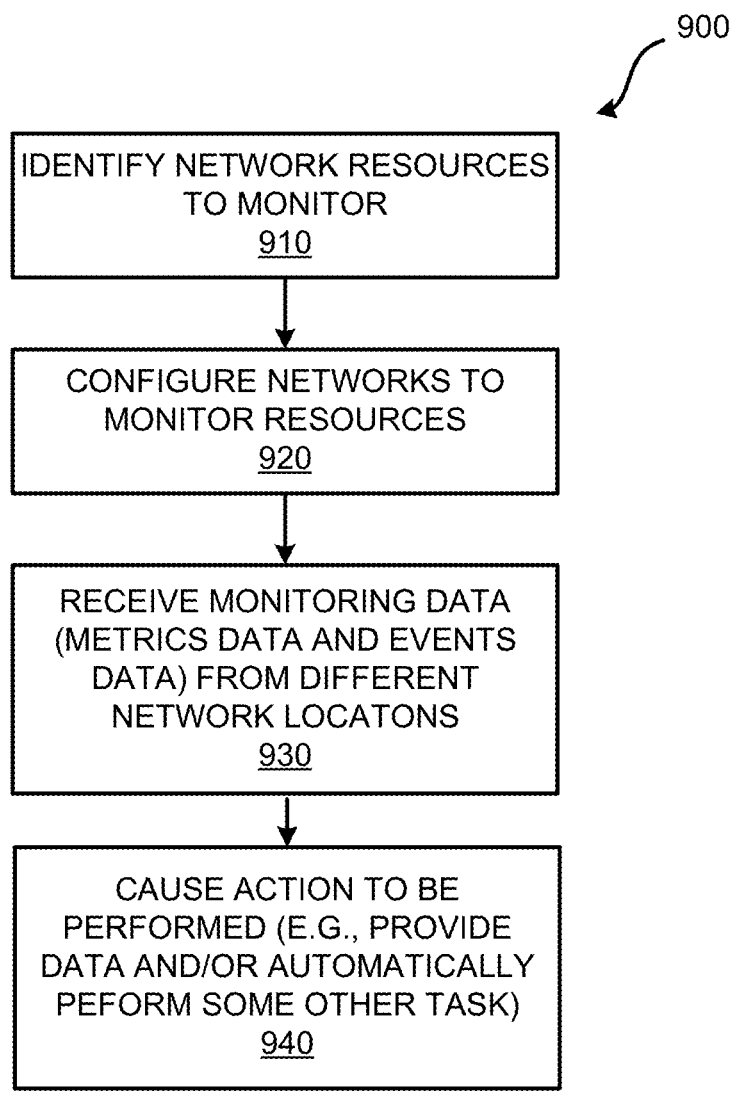
FIG. 9 is a flow diagram showing an illustrative routine 900 for monitoring the global network to generate metrics, according to some examples.

FIG. 9 is a flow diagram showing an illustrative routine 900 for monitoring the global network to generate metrics, according to some examples. The routine 900 may be performed by computing resources 120 associated with the NMS 102 and/or other computing resources associated with the global network.

At 910, the network resources to monitor are identified. As discussed above, the monitoring service 204 may identify network resources to monitor based on input specified by the user 138 and/or identify network resources to monitor based on other specifications. For example, the reachability service 206 may instruct the monitoring service 204 to monitor specified metrics and/or events. In other examples, the monitoring service 204 may monitor computing resources for default metrics.

At 920, the networks are configured to monitor specified computing resources. As discussed above, the monitoring service 204, may instruct the network managers 208 to monitor specified computing resources for one or more metrics and/or events.

At 930, monitoring data is received from the different network locations. As discussed above, the monitoring service 204 may receive monitoring data including the metrics from each of the different networks 118. In this way, the user 138 may access the metrics for the global network without having to access each location separately.

At 940, an action is caused to be performed. As discussed above, the monitoring service 204 may provide events data, and/or metric data to the user 138 via the UI 136. The monitoring service 203 might also provide the data to one or more other services, devices, or components that in turn execute a workflow. For example, the metric data may be utilized to trigger one or more alarms, and/or cause one or more other task flows to be performed (e.g., automatically choose a different data store when the data store is experiencing a high volume of requests). Similarly, an occurrence of an event may cause one or more flows to be performed, such as by global workflow service 304 and/or regional workflow service 318. In some examples, the workflow may be performed by one or more computing resources located in an external network that is part of the global network.

Figure 10:
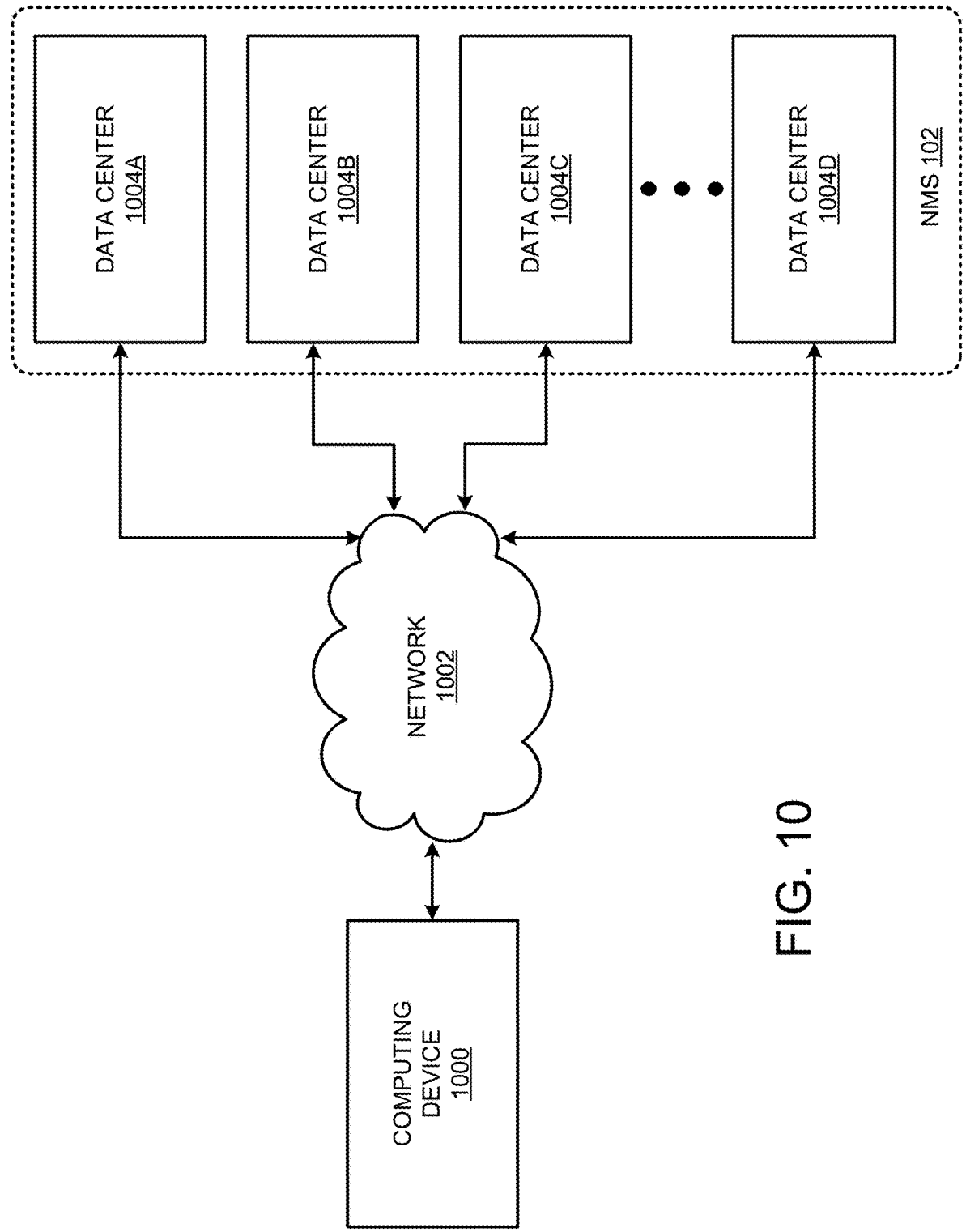
FIG. 10 is a system and network diagram that shows an illustrative operating environment including several data centers that can be configured to implement aspects of the functionality described herein.

FIG. 10 is a system and network diagram that shows one illustrative operating environment for the configurations disclosed herein that includes an NMS 102 that can be configured to provide the functionality described above. As discussed above, the NMS 102 can execute network services that provide computing resources for implementing the functionality disclosed herein. The computing resources implemented by the NMS 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The NMS 102 can also include and utilize other types of computing resources not mentioned specifically herein.

As also discussed above, the computing resources provided by the NMS 102 are enabled in one implementation by one or more data centers 1004A-1004D (which might be referred to herein singularly as "a data center 1004" or collectively as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations. One illustrative configuration for a data center 1004 that can be utilized to implement the technologies disclosed herein will be described below with regard to FIG. 11.

The users can access the services provided by the NMS 102 over a network 1002, which can be a wide area communication network ("WAN"), such as the Internet, an intranet or an Internet service provider ("ISP") network or a combination of such networks. For example, and without limitation, a computing device 1000 operated by a user or other user of the NMS 102, such as the computing device 134, can be utilized to access the NMS 102 by way of the network 1002. It should be appreciated that a local-area network ("LAN"), the Internet, or any other networking topology known in the art that connects the data centers 1004 to remote users and other users can be utilized. It should also be appreciated that combinations of such networks can also be utilized.

Figure 11:
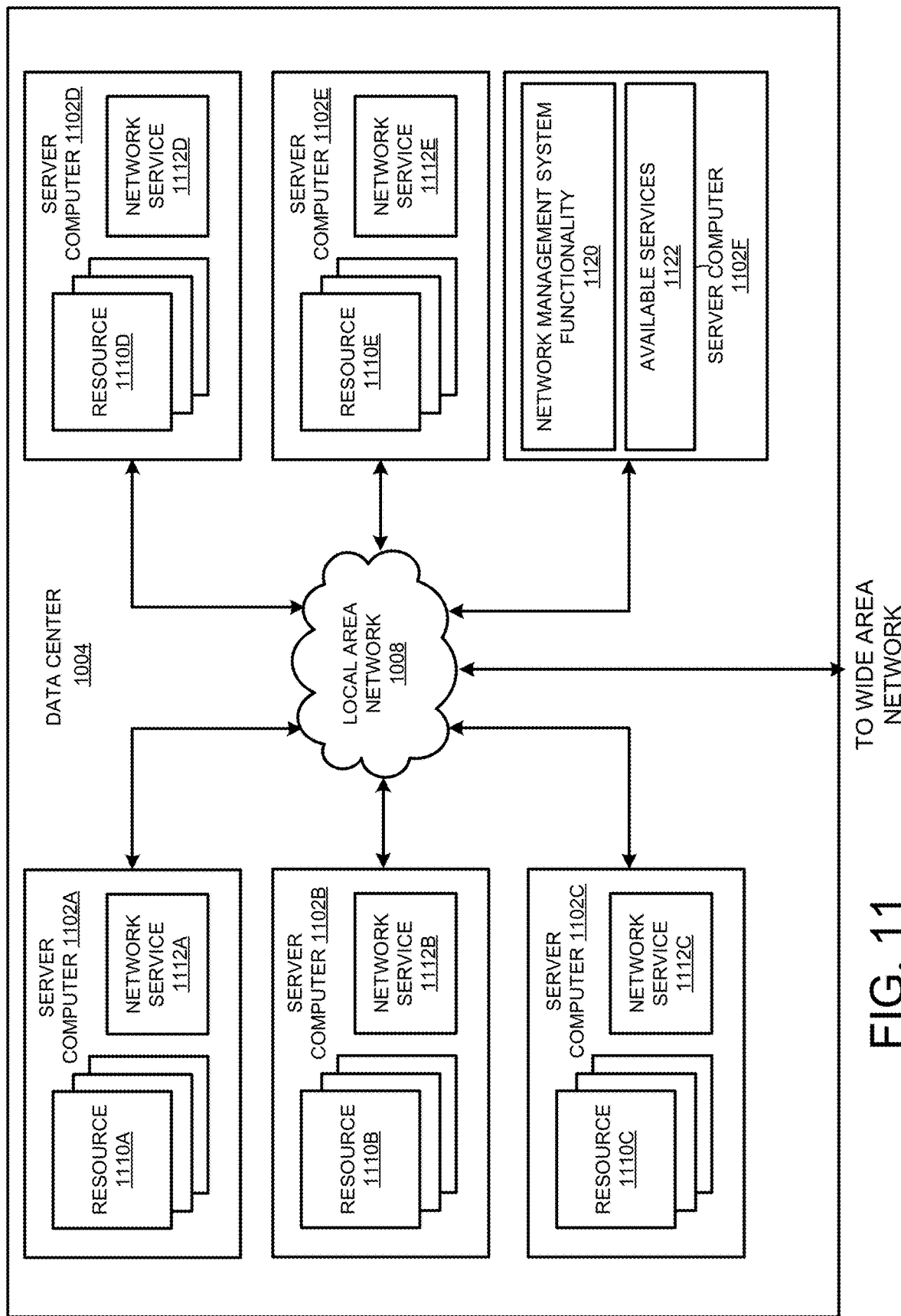
FIG. 11 is a computing system diagram illustrating a configuration for a data center that can be utilized to implement aspects of the technologies disclosed herein.

FIG. 11 is a computing system diagram that illustrates examples for a data center 1004 that can be utilized to configure and manage a global network, and the other functionality disclosed herein. The example data center 1004 shown in FIG. 11 includes several server computers 1102A-1102F (which might be referred to herein singularly as "a server computer 1102" or in the plural as "the server computers 1102").

The server computers 1102 can be standard tower, rack-mount, or blade server computers configured appropriately for providing various types of computing resources 1110 for implementing the functionality disclosed herein. As mentioned above, the computing resources 1110 provided by the data center 1004 can be data processing resources such as VM instances or hardware computing systems, data storage resources, database resources, networking resources, and others. Some of the servers 1102 can also be configured to execute network services 1112A-1112E, respectively, capable of instantiating, providing and/or managing the computing resources 1110A-1110E.

The data center 1004 shown in FIG. 11 also includes a server computer 1102F that can execute some or all of the software components described above. For example, and without limitation, the server computer 1102F can be configured to execute functionality described herein, such as network management system functionality 1120 and other available services 1122. The server computer 1102F can also be configured to execute other components and/or to store data for providing some or all of the functionality described herein. In this regard, it should be appreciated that components or different instances of the services can execute on many other physical or virtual servers in the data centers 1004 in various configurations.

In the example data center 1004 shown in FIG. 11, an appropriate LAN 1108 is also utilized to interconnect the server computers 1102A-1102F. The LAN 1108 is also connected to the network 1002 illustrated in FIG. 10. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004D, between each of the server computers 1102A-1102F in each data center 1004, and, potentially, between computing resources 1110 in each of the data centers 1004. It should be appreciated that the configuration of the data center 1004 described with reference to FIG. 11 is merely illustrative and that other implementations can be utilized.

Figure 12:
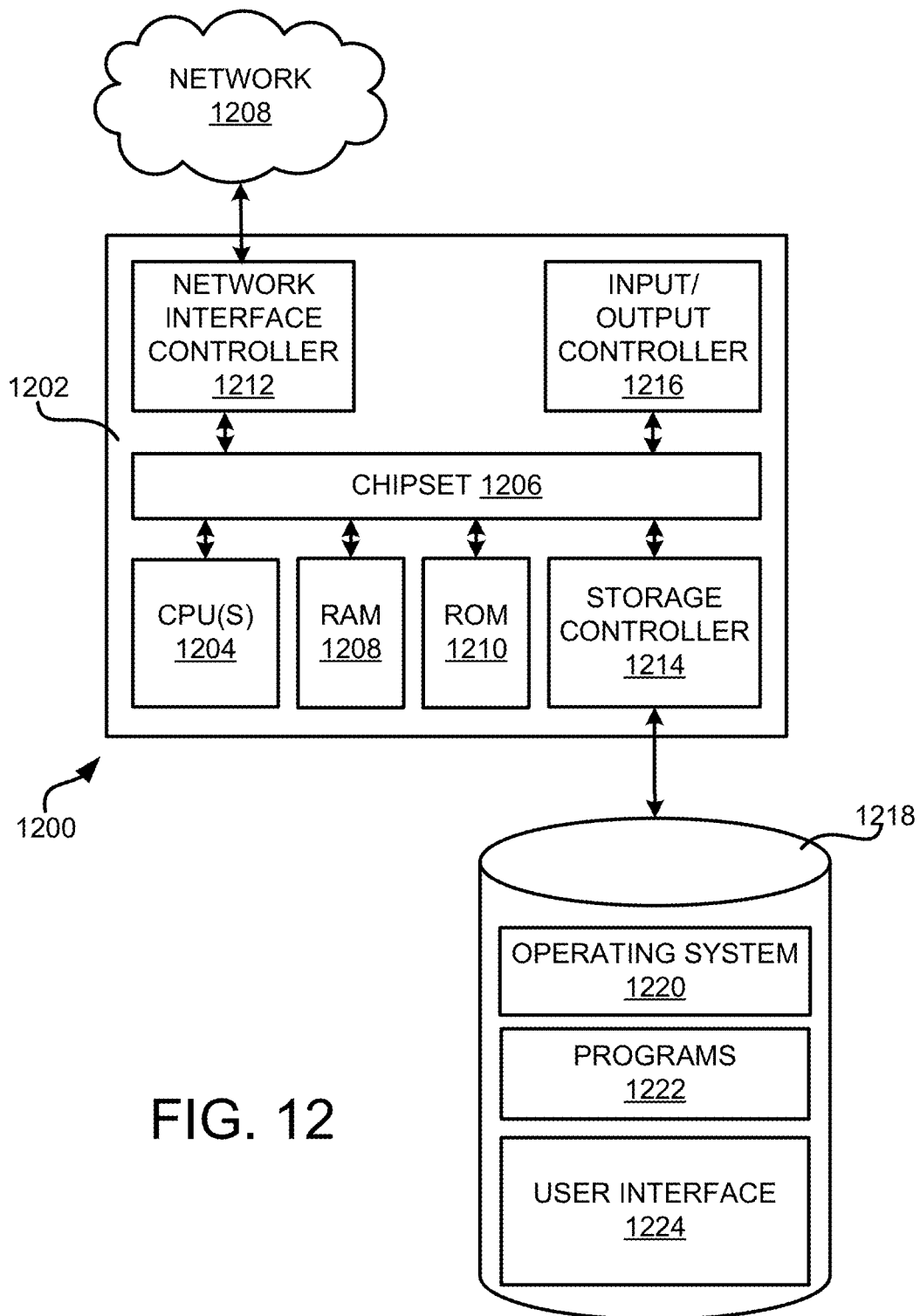
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic process that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a NIC 1212, such as a gigabit Ethernet adapter. The NIC 1212 is capable of connecting the computer 1200 to other computing devices over the network 1208. It should be appreciated that multiple NICs 1212 can be present in the computer 1200, connecting the computer to other types of networks and remote computer systems.

The computer 1200 can be connected to a mass storage device 1218 that provides non-volatile storage for the computer. The mass storage device 1218 can store an operating system 1220, programs 1222, workload control user interface 1224, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 1218 can store other system or application programs and data utilized by the computer 1200.

In examples, the mass storage device 1218 or other computer-readable storage media is encoded with computer-executable instructions which, when loaded into the computer 1200, transform the computer from a general-purpose computing system into a special-purpose computer capable of implementing the configurations described herein. These computer-executable instructions transform the computer 1200 by specifying how the CPUs 1204 transition between states, as described above. According to examples, the computer 1200 has access to computer-readable storage media storing computer-executable instructions which, when executed by the computer 1200, perform the various processes described above with regard to FIGS. 1-12. The computer 1200 can also include computer-readable storage media for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or can utilize an architecture completely different than that shown in FIG. 12.

Based on the foregoing, it should be appreciated that technologies for configuration and management of global private networks have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more processors; and
one or more computer-readable media storing computer-executable instructions that, when executed by the one or more processors, cause the one or more processors to:

provide for display, to a computing device of a user of a service provider network, a graphical user interface (GUI) being utilized to configure a global network spanning across one or more networks of the service provider network, the one or more networks including a first network, a second network, and a third network that is a stand-alone network of one or more stand-alone networks;
generate a graph that depicts the global network;
cause the graph to be displayed via the GUI that includes one or more user interface (UI) indicators, the one or more UI indicators including a first UI gateway indicator representing a first gateway associated with the first network that is associated with a first geographic location, the one or more UI indicators including a second UI gateway indicator representing a second gateway associated with the second network that is associated with a second geographic location, the one or more UI indicators including a UI private network indicator associated with a private network, the private network being included in the first network or the second network, the one or more UI indicators including a UI node indicator that represents a node of the third network, the one or more UI indicators including one or more UI connection indicators that represent one or more network connections, a UI connection indicator of the one or more UI connection indicators being connected to the first UI gateway indicator, the second UI gateway indicator, the UI node indicator, or the UI private network indicator;
receive, via a user selection of at least one UI indicator of the one or more UI indicators, configuration data associated with configuration of the global network;
identify, based on the configuration data, an action to perform within one or more of the first network, the second network, and the one or more stand-alone networks, wherein the action is selected from one or more of configuring a plurality of gateways including the first gateway and the second gateway, configuring one or more of the one or more stand-alone networks, configuring one or more of the one or more network connections, and configuring one or more links;
transmit instructions, to at least one of the one or more stand-alone networks, the first network, and the second network, to cause the action to be performed;
executing one or more workflows based on the configuration data, wherein the one or more workflows cause the action to be performed within the at least one of the one or more stand-alone networks, the first network, and the second network;
generate an updated graph that reflects a current configuration of the global network; and
provide, to the computing device of the user, the updated graph for display within the GUI.

2. The system of claim 1, wherein the computer-executable instructions further cause the one or more processors to:
receive, from the computing device of the user, second configuration data that indicates a request to generate a second graph of at least one of the one or more stand-alone networks;
generate the second graph that represents the at least one of the one or more stand-alone networks;
generate a second updated graph that includes the updated graph and the second graph; and provide, to the computing device of the user, the second updated graph for display within the GUI.

3. The system of claim 1, wherein the computer-executable instructions further cause the one or more processors to:
receive, from the first network, first monitoring data that indicates first operating characteristics of first networking resources in the first network;
receive, from the second network, second monitoring data that indicates second operating characteristics of second networking resources in the second network; and
cause one or more second actions to be performed within one or more of the first network and the second network based on one or more of the first monitoring data and the second monitoring data.

4. The system of claim 3, wherein the computer-executable instructions further cause the one or more processors to:
generate an annotated graph that reflects at least a portion of the first monitoring data and the second monitoring data; and
provide for display, to the computing device of the user, the annotated graph for display within the GUI.

5. The system of claim 1, wherein:
the UI private network indicator includes a first UI private network indicator, and the private network includes a first private network in the first network, and
the one or more UI indicators include a second UI private network indicator associated with a second private network in the second network.

6. The system of claim 1, wherein the UI connection indicator is a first UI connection indicator being connected between the first UI gateway indicator and the second UI gateway indicator, and
wherein the one or more UI connection indicators include a second UI connection indicator being connected between the second UI gateway indicator and the UI node indicator.

7. The system of claim 1, wherein the UI connection indicator is a first UI connection indicator being connected between the first UI gateway indicator and the second UI gateway indicator, and
wherein the one or more UI connection indicators include a second UI connection indicator being connected between the first UI gateway indicator and the UI node indicator.

8. A computer-implemented method comprising:
generating a graph of a global network that includes a stand-alone network and that spans across a first network and a second network, the first network and the second network being hosted by a service provider network;
providing for display, to a computing device of a user of the service provider network, a graphical user interface (GUI) that includes a display of at least a portion of the graph and one or more user interface (UI) elements relating to configuring the global network, the one or more UI elements including a first UI gateway element representing a first gateway associated with the first network that is associated with a first geographic location, the one or more UI elements including a second UI gateway element representing a second gateway associated with the second network that is associated with a second geographic location, the one or more UI elements including a UI private network element associated with a private network, the private network being included in the first network or the second network, the one or more UI elements including a UI node element associated with a node associated with the stand-alone network, the one or more UI elements including one or more UI connection elements that represent one or more network connections, a UI connection element of the one or more UI connection elements being connected to at least one of the first UI gateway element, the second UI gateway element, or the UI private network element;
receiving, from the computing device of the user, configuration data associated with configuration of the global network via at least one user selection of at least one UI element in the one or more UI elements;
identifying, based at least in part on the configuration data, an action to perform within one or more of the first network and the second network, wherein the action is selected from one or more of configuring a plurality of gateways including the first gateway and the second gateway, configuring the stand-alone network, and configuring one or more of the one or more network connections; and
executing one or more workflows based at least in part on the configuration data, wherein the one or more workflows cause the action to be performed within the one or more of the first network and the second network.

9. The computer-implemented method of claim 8, further comprising:
generating an updated graph that reflects a current configuration of the global network; and
providing, to the computing device of the user, the updated graph for display within the GUI.

10. The computer-implemented method of claim 8, wherein the network connection includes an edge connected to the UI node element.

11. The computer-implemented method of claim 10, further comprising:
receiving, via the GUI, second data that indicates another user selection of at least one of the first UI gateway element or the second UI gateway element,
wherein the one or more network connections are displayed within the GUI based at least in part on the other user selection.

12. The computer-implemented method of claim 8, further comprising:
generating a second graph that represents a second stand-alone network that is separate from the global network;
generating an updated graph of the global network that includes the second graph; and
providing, to the computing device of the user, the updated graph for display within the GUI.

13. The computer-implemented method of claim 8, further comprising:
receiving, from the first network, first monitoring data that indicates first operating characteristics of first networking resources in the first network;
receiving, from the second network, second monitoring data that indicates second operating characteristics of second networking resources in the second network; and
causing one or more second actions to be performed based, at least in part, on one or more of the first monitoring data and the second monitoring data.

14. The computer-implemented method of claim 8, further comprising:
receiving, via the GUI, a search term;
receiving search data in response to performing a search of the graph using the search term; and
providing for display within the GUI, at least a portion of the search data.

15. A system comprising:
one or more processors associated with a service provider network; and
one or more computer-readable media storing computer-executable instructions that, when executed by the one or more processors, cause the one or more processors to:
generate a graph of a global network that includes a stand-alone network and that spans across a first network and a second network, the first and second networks being hosted by the service provider network;
provide for display, to a computing device of a user of the service provider network, a graphical user interface (GUI) that includes a display of at least a portion of the graph and one or more user interface (UI) elements relating to configuring the global network, the one or more UI elements including a first UI gateway element representing a first gateway associated with the first network that is associated with a first geographic location, the one or more UI elements including a second UI gateway element representing a second gateway associated with the second network that is associated with a second geographic location, the one or more UI elements including a UI private network element associated with a private network, the private network being included in the first network or the second network, the one or more UI elements including a UI node element associated with a node associated with the stand-alone network, the one or more UI elements including one or more UI connection elements that represent one or more network connections, a UI connection element of the one or more UI connection elements being connected to the first UI gateway element or the second UI gateway element;
receive, from the computing device of the user, configuration data associated with configuration of the global network via at least one user selection of at least one UI element in the one or more UI elements;
identify, based at least in part on the configuration data, an action to perform within one or more of the first network, the second network, and the stand-alone network, wherein the action is selected from one or more of configuring a plurality of gateways including the first gateway and the second gateway, configuring the stand-alone network, and configuring one or more of the one or more network connections; and
executing one or more workflows based at least in part on the configuration data, wherein the one or more workflows cause the action to be performed within the one or more of the first network, the second network, and the stand-alone network.

16. The system of claim 15, wherein the computer-executable instructions further cause the one or more processors to:
generate an updated graph that reflects a current configuration of the global network; and
provide, to the computing device of the user, the updated graph for display within the GUI.

17. The system of claim 15, wherein generating the graph includes generating a network connection of the one or more network connections, the network connection including an edge connected to the stand-alone network.

18. The system of claim 15, wherein the computer-executable instructions further cause the one or more processors to:
receive, via the GUI, second data that indicates another user selection of at least one of the first UI gateway element or the second UI gateway element,
wherein a network connection of the one or more network connections is displayed within the GUI based at least in part on the other user selection.

19. The system of claim 1, wherein the first network is a first virtual network, the second network is a second virtual network different from the first virtual network, and the third network is different from the first network and the second network.

20. The system of claim 15, wherein the first network is a first virtual network, the second network is a second virtual network different from the first virtual network, and the first geographic location is different from the second geographic location.

* * * * *